(12) United States Patent
Ichikawa et al.

(10) Patent No.: US 11,403,806 B2
(45) Date of Patent: Aug. 2, 2022

(54) INFORMATION PROCESSING APPARATUS, INFORMATION PROCESSING METHOD, AND RECORDING MEDIUM

(71) Applicant: SONY CORPORATION, Tokyo (JP)

(72) Inventors: Miwa Ichikawa, Tokyo (JP); Takuro Noda, Tokyo (JP); Maki Imoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/980,103

(22) PCT Filed: Jan. 16, 2019

(86) PCT No.: PCT/JP2019/000979
§ 371 (c)(1),
(2) Date: Sep. 11, 2020

(87) PCT Pub. No.: WO2019/181153
PCT Pub. Date: Sep. 26, 2019

(65) Prior Publication Data
US 2021/0027523 A1 Jan. 28, 2021

(30) Foreign Application Priority Data
Mar. 20, 2018 (JP) .............................. JP2018-053051

(51) Int. Cl.
*G06T 15/20* (2011.01)
*G06F 3/01* (2006.01)
*G06T 19/00* (2011.01)

(52) U.S. Cl.
CPC .............. *G06T 15/20* (2013.01); *G06F 3/011* (2013.01); *G06T 19/003* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 10,503,996 B2* | 12/2019 | Novak | G06K 9/00671 |
| 2015/0332504 A1* | 11/2015 | Wang | G06T 19/006 345/633 |
| 2017/0255258 A1* | 9/2017 | Feiner | G02B 27/0093 |
| 2017/0293356 A1* | 10/2017 | Khaderi | A61B 3/024 |
| 2018/0204386 A1* | 7/2018 | Chen | G06F 3/0346 |

(Continued)

FOREIGN PATENT DOCUMENTS

| | | | | |
|---|---|---|---|---|
| JP | 2006267249 | A | * | 10/2006 |
| JP | 2011191264 | A | * | 9/2011 |

*Primary Examiner* — Yingchun He
(74) *Attorney, Agent, or Firm* — Paratus Law Group, PLLC

(57) ABSTRACT

There is provided an information processing apparatus that presents a virtual object useful for a user while suppressing a reduction in visibility of a real object. The information processing apparatus includes: an acquisition unit that acquires position information of a user and position information of a destination; and a display control unit that adds a first virtual object in association with a position of the destination within a visual field of the user on the basis of the position information of the user and the position information of the destination, in which the display control unit controls transparency of a predetermined virtual object within the visual field on the basis of the position information of the user.

20 Claims, 21 Drawing Sheets

(56) References Cited

U.S. PATENT DOCUMENTS

2018/0307303 A1* 10/2018 Powderly ............... G06F 1/163
2019/0206362 A1* 7/2019 Li ........................... G09G 5/10
2020/0126264 A1* 4/2020 Engelen ............... G06T 15/506

* cited by examiner

INFORMATION PROCESSING APPARATUS, INFORMATION PROCESSING METHOD, AND RECORDING MEDIUM

CROSS REFERENCE TO PRIOR APPLICATION

This application is a National Stage Patent Application of PCT International Patent Application No. PCT/JP2019/000979 (filed on Jan. 16, 2019) under 35 U.S.C. § 371, which claims priority to Japanese Patent Application No. 2018-053051 (filed on Mar. 20, 2018), which are all hereby incorporated by reference in their entirety.

FIELD

The present disclosure relates to an information processing apparatus, an information processing method, and a recording medium.

BACKGROUND

In recent years, a technology of improving convenience of a user by presenting a virtual object to the user has been known. For example, a technology of presenting a map including a road, a three-dimensional building, and the like, as an example of the virtual object to the user has been disclosed (see, for example, Patent Literature 1). More specifically, a technology of extracting a part of the road which is hidden behind the building structure on the basis of depth information of the road of a drawing object and the building structure and drawing the extracted part of the road in a color or a pattern that can be distinguished from a normal road and building has been disclosed.

In addition, a technology of presenting navigation information, in addition to a map, as an example of a virtual object to a user has been disclosed (see, for example, Patent Literature 2). More specifically, a technology of drawing the navigation information with priority over the map in a case where the map and the navigation information collide with each other in order to prevent the map and the navigation information from interfering with each other within a visual field of the user has been disclosed.

CITATION LIST

Patent Literature

Patent Literature 1: JP 2007-26201 A
Patent Literature 2: JP 2015-115034 A

SUMMARY

Technical Problem

However, the virtual object useful for the user is presented, while visibility of a real object existing within the visual field of the user may be reduced due to the virtual object. Therefore, it is preferable to provide a technology of presenting the virtual object useful for the user while suppressing the reduction in the visibility of the real object.

Solution to Problem

According to the present disclosure, an information processing apparatus is provided that includes: an acquisition unit that acquires position information of a user and position information of a destination; and a display control unit that adds a first virtual object in association with a position of the destination within a visual field of the user on the basis of the position information of the user and the position information of the destination, wherein the display control unit controls transparency of a predetermined virtual object within the visual field on the basis of the position information of the user.

According to the present disclosure, an information processing method is provided that includes: acquiring position information of a user and position information of a destination; adding a first virtual object in association with a position of the destination within a visual field of the user on the basis of the position information of the user and the position information of the destination; and controlling, by a processor, transparency of a predetermined virtual object within the visual field on the basis of the position information of the user.

According to the present disclosure, a computer-readable recording medium in which a program is recorded is provided that causes a computer to function as an information processing apparatus including: an acquisition unit that acquires position information of a user and position information of a destination; and a display control unit that adds a first virtual object in association with a position of the destination within a visual field of the user on the basis of the position information of the user and the position information of the destination, wherein the display control unit controls transparency of a predetermined virtual object within the visual field on the basis of the position information of the user.

Advantageous Effects of Invention

As described above, according to present disclosure, a technology of presenting a virtual object useful for a user while suppressing a reduction in visibility of a real object is provided. Note that the effect described above is not necessarily restrictive, and any effect set forth in the present specification or other effects that can be grasped from the present specification may be accomplished together with or instead of the effect described above.

DESCRIPTION OF EMBODIMENTS

Figure 1:
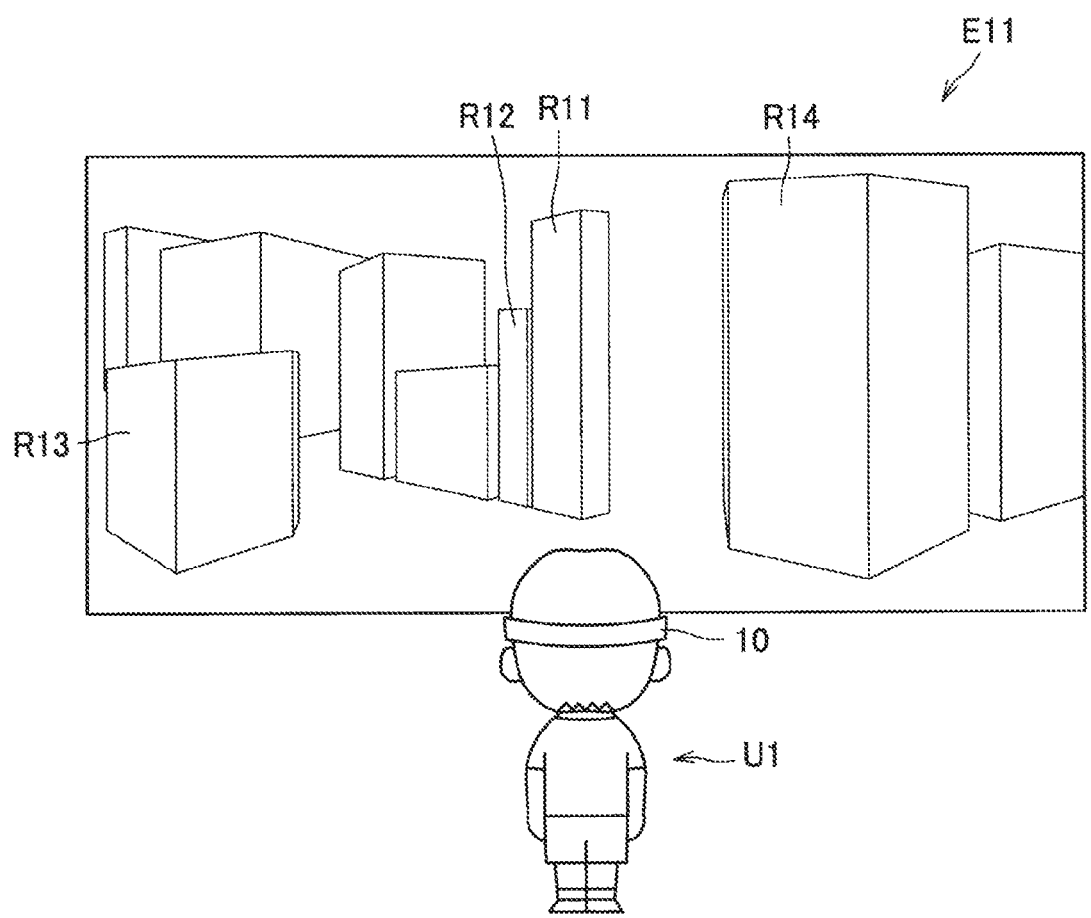
FIG. 1 is a view illustrating a configuration example of an information processing apparatus according to an embodiment of the present disclosure.

Hereinafter, preferred embodiments of the present disclosure will be described in detail with reference to the accompanying drawings. Note that in the present specification and the drawings, components having substantially the same functional configuration will be denoted by the same reference numerals, and an overlapping description thereof will thus be omitted.

In addition, in the present specification and the drawings, a plurality of components having substantially the same or similar functional configuration may be distinguished from each other by attaching different numbers after the same reference numerals. However, in a case where the plurality of components having substantially the same or similar functional configuration need not be particularly distinguished from each other, only the same reference numeral is attached to the plurality of components having substantially the same or similar functional configuration. In addition, similar components in different embodiments may be distinguished from each other by attaching different alphabets after the same reference numerals. However, in a case where the respective similar components need not be particularly distinguished from each other, only the same reference numeral is assigned to the respective similar components.

Note that a description will be given in the following order.
1. Overview
2. Details of embodiment
2.1. Configuration example of information processing apparatus
2.2. Functional configuration example of information processing apparatus
3. Details of embodiment
3.1. Example of outdoor user
3.2. Coping with brightness of environment
3.3. Example of indoor user
3.4. Addition of virtual object to passing point
3.5. Display in area unit.
3.6. Another example of indoor user
3.7. Application to virtual space
3.8. Specific example of control of transparency
3.9. In case where there are a plurality of destinations
3.10. Display of distance to destination.
3.11. In case of using train
4. Hardware configuration example
5. Conclusion
6. Modification
7. Application example <1. Overview>

First, an overview of an embodiment of the present disclosure will be described. In recent years, a technology of improving convenience of a user by presenting a virtual object to the user has been known. For example, a technology of presenting a map including a road, a three-dimensional building, and the like, as an example of the virtual object to the user has been disclosed. More specifically, a technology of extracting a part of the road which is hidden behind the building structure on the basis of depth information of the road of a drawing object and the building structure and drawing the extracted part of the road in a color or a pattern that can be distinguished from a normal road and building has been disclosed.

In addition, a technology of presenting navigation information, in addition to a map, as an example of a virtual object to a user has been disclosed. More specifically, a technology of drawing the navigation information with priority over the map in a case where the map and the navigation information collide with each other in order to prevent the map and the navigation information from interfering with each other within a visual field of the user has been disclosed.

However, the virtual object useful for the user is presented, while visibility of a real object existing within the visual field of the user may be reduced due to the virtual object. Therefore, in an embodiment of the present disclosure, a technology of presenting the virtual object useful for the user while suppressing the reduction in the visibility of the real object will be mainly described.

In addition, for example, even though a map drawn from a bird's-eye view point is presented to the user and the user finds a destination. (for example, a place of interest to the user, or the like) in the map, the user needs to search for a destination in a real space while confirming a correspondence relation between the map and the real space. For this reason, even though the map drawn from the birds-eye view point is presented to the user, it is difficult for the user to intuitively grasp the position of the destination. According to an embodiment of the present disclosure, it becomes possible to intuitively grasp the position of the destination.

Furthermore, in a case where the map is presented to the user uniformly in all azimuths, it is difficult for the user to find the destination in the map. According to an embodiment of the present disclosure, it becomes possible for the user to easily find the destination in the map. Furthermore, in a case where the destination is hidden behind a real object (for example, a building, a pillar, a shelf, or the like), or the like, it becomes difficult to find the destination in the real space. According to an embodiment of the present disclosure, it becomes possible to easily find the destination in the real space.

Hereinabove, the overview of the embodiment of the present disclosure has been described.

<2. Details of Embodiment>

Hereinafter, details of an embodiment of the present disclosure will be described.

[2.1. Configuration Example of Information Processing Apparatus]

First, a configuration example of an information processing apparatus according to an embodiment of the present disclosure will be described.

FIG. 1 a view illustrating a configuration example of an information processing apparatus according to an embodiment of the present disclosure. As illustrated in FIG. 1, a user U1 exists in a real space. Then, a visual field E11 is provided to the user U1 through a screen of an information processing apparatus 10. In addition, real objects R11 to R14 existing in the real space exist in the visual field E11. Here, a case where each of the real objects R11 to R14 is a building is illustrated in FIG. 1. However, the real objects R11 to R14 existing in the visual field E11 are not limited to the buildings.

In addition, hereinafter, a case where a destination of the user U1 is a bookstore existing on a second floor of the real object R11 (building) is assumed. However, a floor of the destination of the user U1 is not limited to the second floor, and a type of destination of the user U1 is not limited to the bookstore. In addition, the destination of the user U1 may not be the building. Furthermore, in FIG. 1, a case where the user U1 exists outdoors is illustrated. However, as described later, the user U1 may exist indoors.

Note that in an embodiment of the present disclosure, a case where the information processing apparatus 10 as a see-through type eyewear display is mainly assumed. However, the information processing apparatus 10 is not limited to the see-through type eyewear display. For example, the information processing apparatus 10 may be a smartphone, may be a mobile phone, may be a tablet terminal, may be a camera, may be a personal computer (PC), or may be another device.

The configuration example of the information processing apparatus 10 according to the embodiment of the present disclosure has been described.

[2.2. Functional Configuration Example of Information Processing Apparatus]

Next, a functional configuration example of the information processing apparatus 10 will be described.

Figure 2:
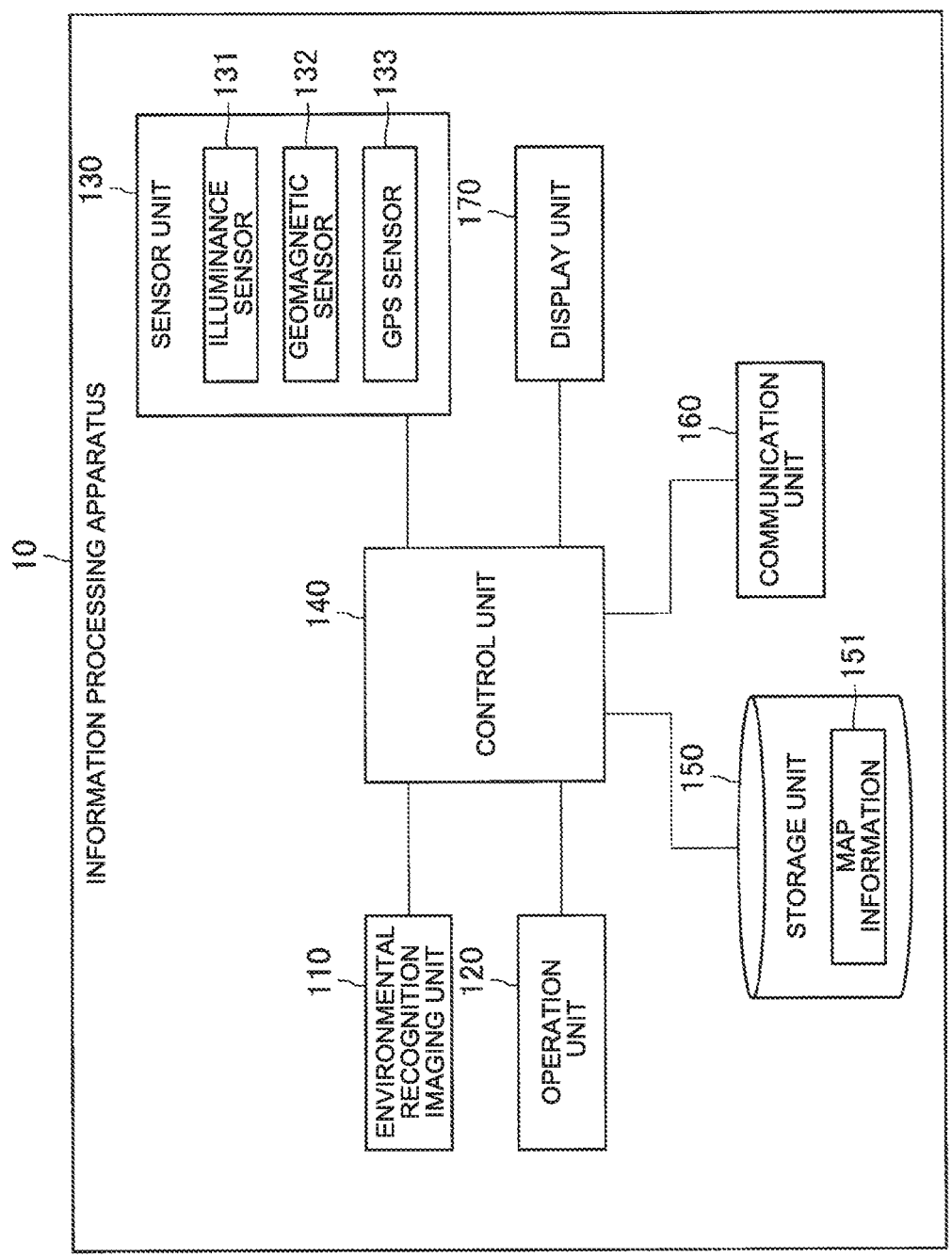
FIG. 2 is a view illustrating a functional configuration example of the information processing apparatus.

FIG. 2 is a view illustrating a functional configuration example of the information processing apparatus 10. As illustrated in FIG. 2, the information processing apparatus 10 includes an environment recognition imaging unit 110, an operation unit 120, a sensor unit 130, a control unit 140, a storage unit 150, a communication unit 160, and a display unit 170. Hereinafter, these functional blocks included in the information processing apparatus 10 will be described.

The environment recognition imaging unit 110 is constituted by an image sensor, and obtains an environment recognition image by imaging a visual field of a user by the image sensor. Here, a type of the image sensor is not limited. For example, the image sensor may be configured to include a camera (for example, an RGB camera, a depth camera, a polarization camera, or the like) or may be configured to include an infrared sensor.

The operation unit 120 has a function of receiving an input of an operation by the user. In the embodiment of the present disclosure, a case where the operation unit 120 includes a button is mainly assumed. However, the operation unit 120 is not limited to including the button. For example, the operation unit 120 may include a touch panel, may include a touch pad, may include a switch, or may include a lever. In addition, the operation unit 120 may include a microphone that detects a user's voice or may be an image sensor that detects a user's line of sight.

The sensor unit 130 obtains sensing data by sensing an environment. In the embodiment of the present disclosure, a case where the sensor unit 130 includes an illuminance sensor 131, a geomagnetic sensor 132, and a global positioning system (GPS) sensor 133 is mainly assumed. The illuminance sensor 131 has a function of detecting brightness of the environment. The geomagnetic sensor 132 has a function of detecting an azimuth (direction) of the user. The GPS sensor 133 has a function of receiving a satellite signal from a GPS satellite. However, a type of the sensor included in the sensor unit 130 is not limited. For example, the sensor unit 130 may include an acceleration sensor and a gyro sensor in addition to the geomagnetic sensor 132. In such a case, the azimuth (direction) of the user can be detected with higher accuracy on the basis of these sensors.

Figure 3:
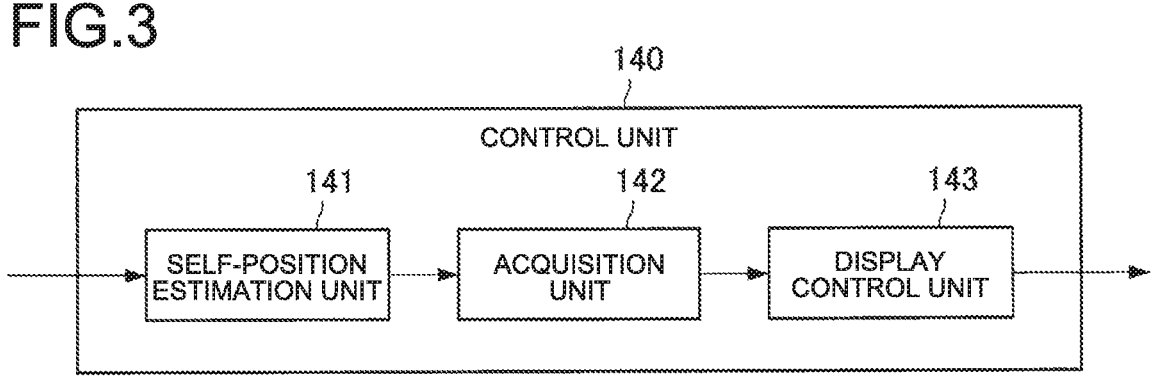
FIG. 3 is a view illustrating a detailed functional configuration example of a control unit.

The control unit 140 may be constituted by processing apparatuses such as one or more central processing units (CPUs) or the like. In a case where this block is constituted by the processing apparatus such as the CPU or the like, such a processing apparatus may be constituted by an electronic circuit. The control unit 140 can be realized by executing a program by such a processing apparatus. FIG. 3 is a view illustrating a detailed functional configuration example of the control unit 140. As illustrated in FIG. 3, the control unit 140 includes a self-position estimation unit 141, an acquisition unit 142, and a display control unit 143. Details of functions of these blocks will be described later.

A description will be continued again with reference to FIG. 2. The storage unit 150 is configured to include a memory, and is a recording medium storing the program executed by the control unit 140 and storing data necessary for executing the program in addition, the storage unit 150 temporarily stores data for calculation by the control unit 140. For example, the storage unit 150 is constituted by a magnetic storage unit device, a semiconductor storage device, an optical storage device, or a magneto-optical storage device. In the embodiment of the present disclosure, a case where the storage unit 150 stores map information 151 indicating a map of an actual size is assumed.

The communication unit 160 is configured to include a communication circuit and has a function of performing communication with another apparatus via a network. For example, the communication unit 160 has a function of acquiring data from another apparatus and providing data to another apparatus. In the embodiment of the present disclosure, a case where the communication unit 160 performs wireless communication with an access point of a wireless local area network (LAN) by Wi-Ni (registered trademark), and is connected to the network via the access point is assumed.

The display unit 170 outputs various information. For example, the display unit 170 has a screen that provides a visual field to the user, and may include a display that can perform a visually recognizable display on the screen. At this time, the display may be a liquid crystal display or may be an organic electro-luminescence (EL) display. In addition, as described above, the user can visually recognize a real space through the screen of the display unit 170.

Note that in the embodiment of the present disclosure, a case where the environment recognition imaging unit 110, the operation unit 120, the sensor unit 130, the control unit 140, the storage unit 150, the communication unit 160, and the display unit 170 exist inside the information processing apparatus 10 is mainly assumed. However, at least one of the environment recognition imaging unit 110, the operation unit 120, the sensor unit 130, the control unit 140, the storage unit 150, the communication unit 160, and the display unit 170 may exist outside the information processing apparatus 10.

Hereinabove, the functional configuration example of the information processing apparatus 10 according to the embodiment of the present disclosure has been described.

<3. Details of Embodiment>

Hereinafter, details of an embodiment of the present disclosure will be described.

[3.1. Example of Outdoor User]

Figure 4:
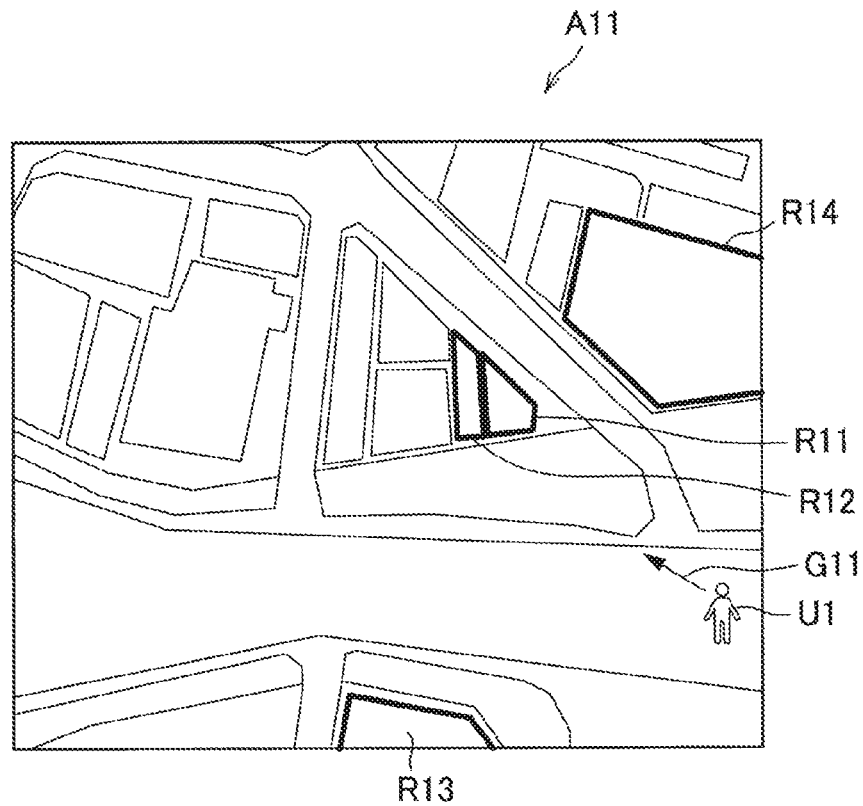
FIG. 4 is a view illustrating an example of a wide area map as an example of map information.

FIG. 4 is a view illustrating an example of a wide area map as an example of the map information 151 (FIG. 2). Referring to FIG. 4, a wide area map A11 is illustrated. The wide area map A11 is drawn from a bird's eye view point. In addition, the wide area map A11 is configured by associating names of each point with latitude/longitude information. The name of the point may be a name of a facility (for example, a building, a store, or the like) or may be a name of a background (for example, a river, a railway station, or the like). On the wide area map A11, the real objects R11 to R14 (buildings) existing in the visual field E11 (FIG. 1) are drawn. Note that the visual field E11 (FIG. 1) is provided to the user U1 when the user U1 turns his/her line of sight toward a direction G11.

First, a name of the destination is set by the user. When the name of the destination is set, the acquisition unit 142 acquires position information (latitude/longitude information) of the destination corresponding to the name of the destination from the wide area map A11. Here, since the destination is the bookstore existing on the second floor of the real object R11 (building) as described above, a case where a name of the real object R11 (building) is set as the name of the destination and the acquisition unit 142 acquires position information of the real object R11 (building) corresponding to the name of the real object R11 (building) from the wide area map A11 is assumed.

In addition, the self-position estimation unit 141 estimates a position of the user (that is, a position of the information processing apparatus 10). Here, a case where the self-position estimation unit 141 estimates the position of the user on the basis of the satellite signal received by the GPS sensor 133 is assumed. In such a case, the acquisition unit 142 acquires the position information (latitude/longitude information) of the user from the self-position estimation unit 141.

Then, the display control unit 143 adds a virtual object (first virtual object) to the position of the destination within the visual field of the user on the basis of the position information of the destination. More specifically, the display control unit 143 may arrange the virtual object (first virtual object) at the position of the destination in an augmented reality space on the basis of the position information of the user, the position information of the destination, and the direction of the user detected by the geomagnetic sensor 132.

Furthermore, the acquisition unit 142 also acquires position information of a point different from the destination from the wide area map A11. For example, the acquisition unit 142 acquires position information of a point which is in a range within a predetermined angle based on a direction from the position of the user to the position of the destination (hereinafter, also referred to as a "destination direction") and whose distance from the position of the user is larger than a threshold (third threshold) and smaller than a threshold (fourth threshold).

Then, the display control unit 143 adds a virtual object (third virtual object) to a position of the point different from the destination within the visual field of the user on the basis of the position information of the user and the position information of the point different from the destination. More specifically, the display control unit 143 may arrange the virtual object (third virtual object) at the position of the point in an augmented reality space on the basis of the position information of the user, the position information of the point, and the direction of the user detected by the geomagnetic sensor 132.

Figure 5:
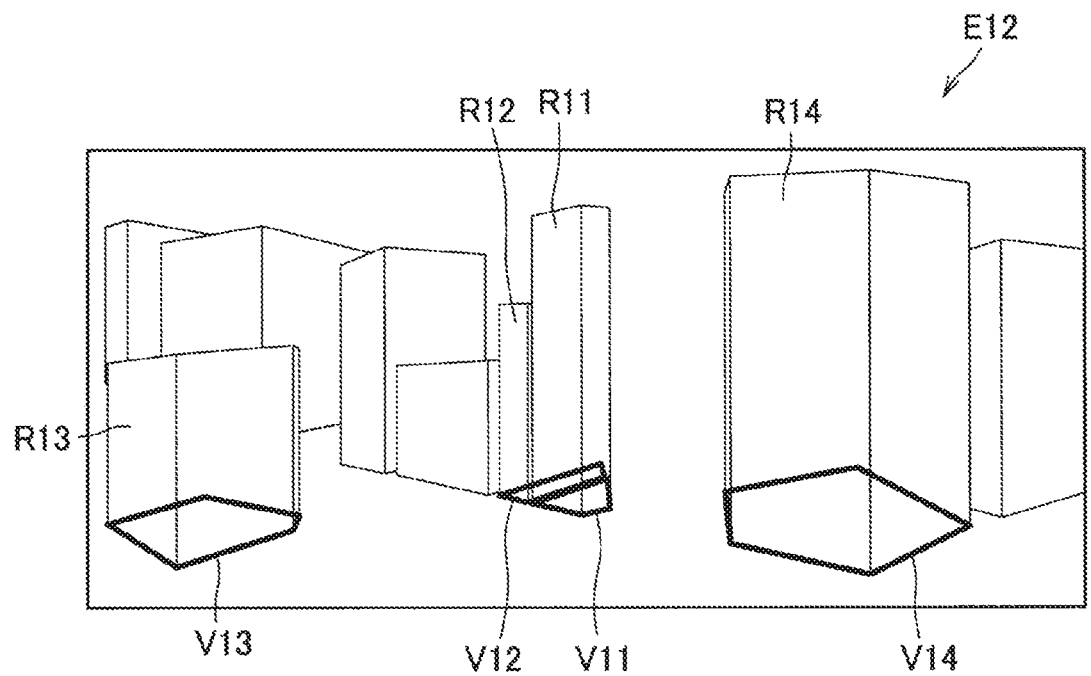
FIG. 5 is a view illustrating a display example of a virtual object.

FIG. 5 is a view illustrating a display example of a virtual object. Referring to FIG. 5, the real object R11 (building) set as the destination is illustrated in a visual field E12 of the user. In the manner as described above, a virtual object V11 is added to a position of the real object R11 (building) set as the destination, by the display control unit 143. Therefore, the position of the destination can be intuitively grasped by the position of the virtual object V11. Furthermore, even though the destination is hidden behind the real object R11 (building), the user can easily find the destination in the real space while seeing the virtual object V11. In addition, virtual objects V12 to V14 are also added to positions of the real objects R12 to R14 (buildings) at points different from the destination by the display control unit 143.

Sizes of the virtual objects V11 to V14 are not limited. However, as described above, in the embodiment of the present disclosure, a case where the map information is information indicating the map of the actual size is assumed. Therefore, it is preferable that the display control unit 143 matches the wide area map A11 of the actual size with the position (ground) and the direction of the user in the augmented reality space. Then, it is preferable that the display control unit 143 causes a virtual object of the position of the destination in the wide area map A11 matched with the position (ground) and direction of the user to be displayed as the virtual object V11 and causes virtual objects of the points different from the destination to be displayed as the virtual objects V12 to V14.

As such, the virtual objects of the actual sizes are arranged in the augmented reality space, such that the virtual objects V11 to V14 matched with sizes of the real objects R11 to R14 are presented to the user, as illustrated in FIG. 5. Therefore, the user can more intuitively understand the positions of the destination and the points different from the destination by receiving the presented virtual objects V11 to V14. Note that as described later, an a case where a map an a building is used instead of the wide area map A11, it is preferable to match the map with a floor surface instead of the ground.

In addition, in the embodiment of the present disclosure, the display control unit 143 controls transparency of a predetermined virtual object in the visual field E12 on the basis of the position information of the user. Here, the predetermined virtual object whose transparency is controlled may be any of the virtual objects V11 to V14. Alternatively, the predetermined virtual object whose transparency is controlled may be a virtual object (second virtual object) added to a position of a passing point existing between the position of the user and the position of the destination, as described later.

Therefore, it is possible to present the virtual object useful to the user while suppressing a reduction in visibility of the real object to which the virtual object is added. Note that a definition of the transparency is not limited. For example, the transparency may refer to changing an alpha value provided for each pixel of the virtual object.

Here, the alpha value is a value numerically expressing the transparency separately from color information, and can conceptually represent a fully opaque state of 0% to a completely transparent state of 100% (that is, a state in which a superimposed object (virtual object) of the pixel not displayed). An integer of 8 bits is most often used as the alpha value, but an integer value such as 1, 4, 8, 16 bits or the like or a floating point number may be assigned as the alpha value.

In a case where the alpha value is a minimum value (in a case where the alpha value is 0 in a case where the alpha value is expressed by an integer value of 8 bits), transparency of the pixel is maximum. On the other hand, in a case where the alpha value is a maximum value (in a case where the alpha value is 255 in a case where the alpha value is expressed by an integer value of 8 bits), opacity of the pixel becomes maximum (the pixel is in a painted-out state). When the transparency is decreased (the alpha value is increased), the superimposed object is displayed darker (brighter). On the other hand, when the transparency is increased (the alpha value is decreased), the superimposed object is displayed lighter (darker).

Note that in the drawings of the present application, the thicker the line of the virtual object, the lower the transparency of the virtual object (the brighter the virtual object), unless otherwise specified. In addition, in a case where the line of the virtual object is a solid line, the transparency of the virtual object is lower (the virtual object is brighter) than in a case where the line of the virtual object is a broken line.

Figure 6:
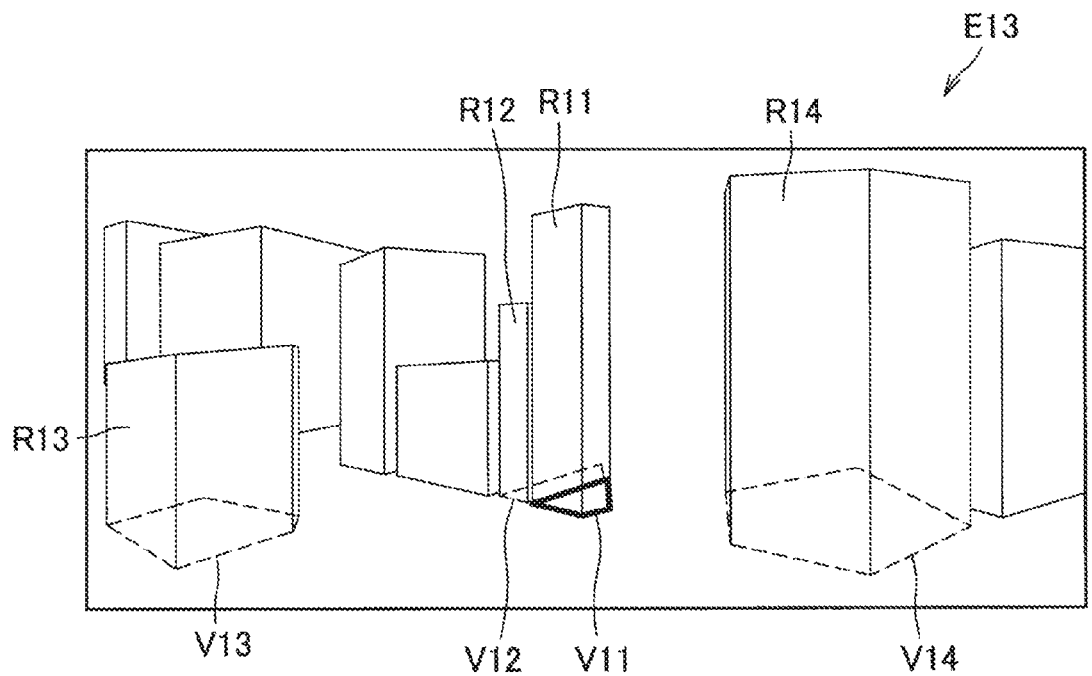
FIG. 6 is a view illustrating a control example of transparency of a virtual object.

FIG. 6 is a view illustrating a control example of transparency of a virtual object. Referring to FIG. 6, a visual field E13 of the user is illustrated. Referring to the visual field E13, transparency of the virtual object V11 added to the real object R11 (building) set as the destination is controlled to be lower than that of each of the virtual objects V12 to V14 added to the real objects R12 to R14 (buildings) that are points different from the destination by the display control unit 143. As such, the destination is presented to the user to be brighter than the points different from the destination, such that the user can intuitively understand the position of the destination.

Figure 7:
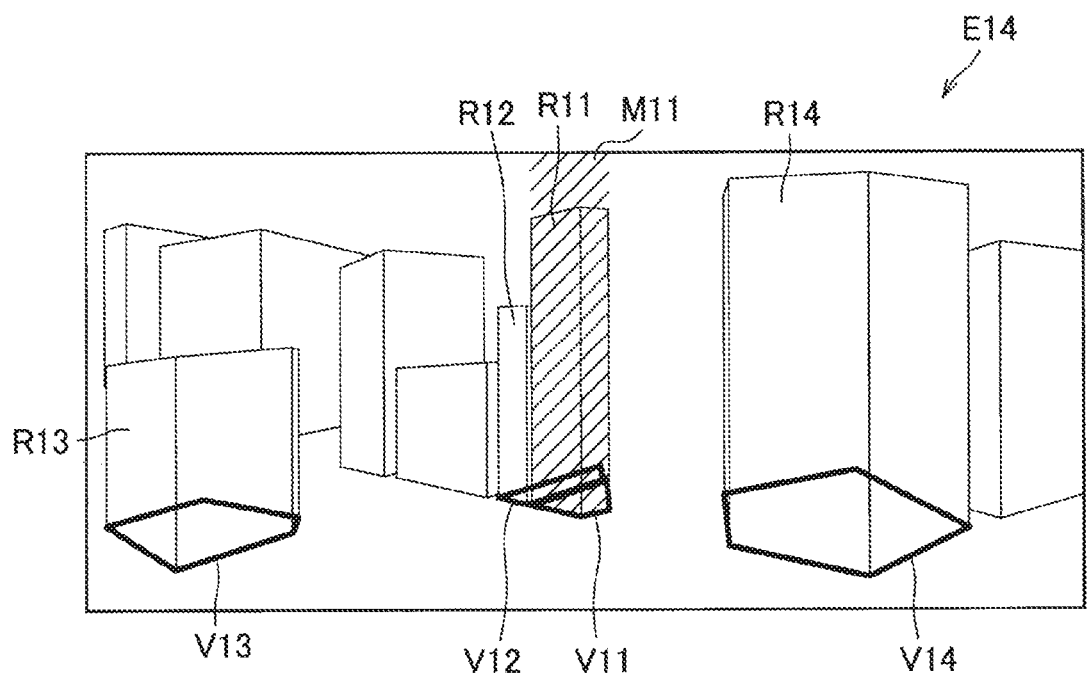
FIG. 7 is a view illustrating a marker display example at a position of a destination within a visual field.

In addition, the display control unit 143 may cause a marker to be displayed at the position of the destination within the visual field of the user in order to make it easy to grasp the position of the destination. FIG. 7 is a view illustrating a marker display example at a position of a destination within a visual field. As illustrated in FIG. 7, the display control unit 143 may cause a marker M11 to be displayed at the position of the real object R11 (building) set as the destination in a visual field E14. Here, a size, a shape, a color, and the like, of the marker M11 are not particularly limited.

Note that here, a case where the display control unit 143 causes the marker M11 to be displayed regardless of a distance between the position of the user and the position of the destination has been assumed. However, the display control unit 143 may cause the marker M11 to be displayed only in a case where the distance between the position of the user and the position of the destination is larger than a threshold (first threshold). Therefore, in a case where the real object R11 (building) set as the destination exists in the distance, such that visibility of the real object R11 (building) is low, the position of the real object R11 (building) set as the destination can be easily grasped by the marker M11.

In addition, the transparency of the virtual object V11 added to the real object R11 (building) set as the destination may be constant or may be changed according to a situation. For example, the display control unit 143 may control the transparency of the virtual object V11 added to the real object R11 (building) set as the destination, on the basis of the distance between the position of the user and the position of the destination.

For example, when the user approaches the destination, it is preferable to suppress the brightness of the virtual object V11 in order to improve the visibility of the real space. Therefore, the display control unit 143 may increase the transparency of the virtual object V11 added to the real object R11 (building) set as the destination (may darken the virtual object V11) in a case where the distance between the position of the user and the position of the destination is smaller than the threshold (first threshold) as compared with a case where the distance is larger than the threshold (first threshold).

At this time, the transparency may be gradually increased in order to reduce a sense of incongruity given to the user. In addition, the display control unit 143 may change the first threshold according to whether the user exists outdoors or exists indoors. For example, the display control unit 143 may increase the first threshold in a case where the user exists outdoors as compared with a case where the user exists indoors. Note that it may be determined in any manner whether or not the user exists outdoors. As an example, it may be determined whether or not the user exists indoors according to whether or not the information processing apparatus 10 is connected to an access point in the building.

Meanwhile, even in a case where the user is distant from the destination, the brightness of the virtual object V11 may be suppressed in order to improve the visibility of the real space. The display control unit 143 may increase the transparency of the virtual object V11 (may darken the virtual object V11) in a case where the distance between the position of the user and the position of the destination is larger than a threshold (second threshold) as compared with a case where the distance between the position of the user and the position of the destination is smaller than the threshold (second threshold).

At this time, the transparency may be gradually increased in order to reduce a sense of incongruity given to the user. In addition, the display control unit 143 may change the second threshold according to whether the user exists outdoors or exists indoors. For example, the display control unit 143 may increase the second threshold in a case where the user exists outdoors as compared with a case where the user exists indoors.

In addition, a case where granularity of the wide area map A11 is constant has been assumed hereinabove, but the granularity of the wide area map A11 may be changed according to a situation. For example, the display control unit 143 may change the granularity of the wide area map A11 according to the distance between the position of the user and the position of the destination. More specifically, it is assumed that the smaller the distance between the position of the user and the position of the destination, the more information the user requires. The display control unit 143 may increase the granularity of the wide area map A11 (may increase the number of displayed virtual objects) as the distance between the position of the user and the position of the destination is smaller. Note that such control of the granularity is not limited to being performed on the wide area map A11, and may be performed on any type of map (for example, a floor map or the like).

[3.2. Coping with Brightness of Environment]

Here, a case where brightness of the environment in which the user exists is not constant is assumed. For example, it is assumed that brightness of the environment is lower in a case where the user exists outdoors at night than in a case where the user exists outdoors in the daytime. At this time, in order to make it easy to see the virtual object, it is preferable that the (transparency) brightness of the virtual object is controlled according to the brightness of the environment. Such control of the transparency according to the brightness of the environment will be described.

Figure 8:
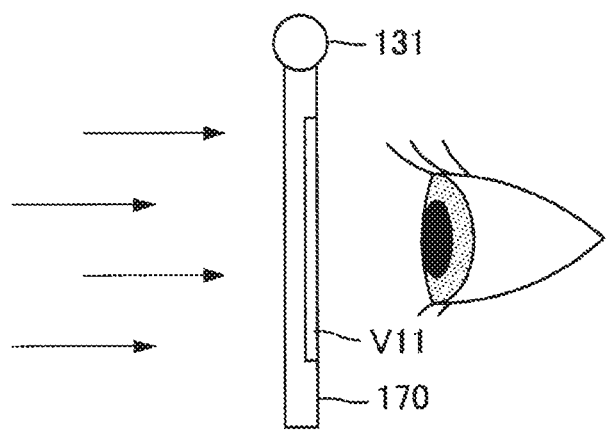
FIG. 8 is a view for describing an example of controlling transparency of a virtual object on the basis of brightness of an environment.

FIG. 8 is a view for describing an example of controlling transparency of a virtual object on the basis of brightness of an environment. As illustrated in FIG. 8, the illuminance sensor 131 is provided near the display unit 170. The illuminance sensor 131 can detect the brightness of the environment.

Therefore, it is preferable that the display control unit 143 controls the transparency of the virtual object V11 on the basis of the brightness of the environment detected by the illuminance sensor 131. For example, the display control unit 143 may make it easy to see the virtual object V11 by decreasing the transparency of the virtual object V11 (making the virtual object V11 brighter) as the brightness of the environment is higher. Note that transparency of the other virtual objects displayed by the display unit 170 may also be controlled in a manner similar to a manner of controlling the transparency of the virtual object V11.

Alternatively, the display control unit 143 may control brightness of the display unit 170 displaying the virtual object V11 on the basis of the brightness of the environment detected by the illuminance sensor 131. For example, the display control unit 143 may make it easy to see the virtual object V11 by increasing the brightness of the display unit 170 as the environment brightness is lower.

[3.3. Example of Indoor User]

In the manner as described above, a case where the destination of the user U1 is the bookstore existing on the second floor of the real object R11 (building) and the user U1 has arrived at the bookstore is assumed. For example, the information processing apparatus 10 is connected to an access point installed in the bookstore. Then, a floor map and an arrangement map of books in a bookshelf are acquired as an example of the map information by the acquisition unit 142. The user sets a title of a book that he or she wants to search for as the name of the destination.

Figure 9:
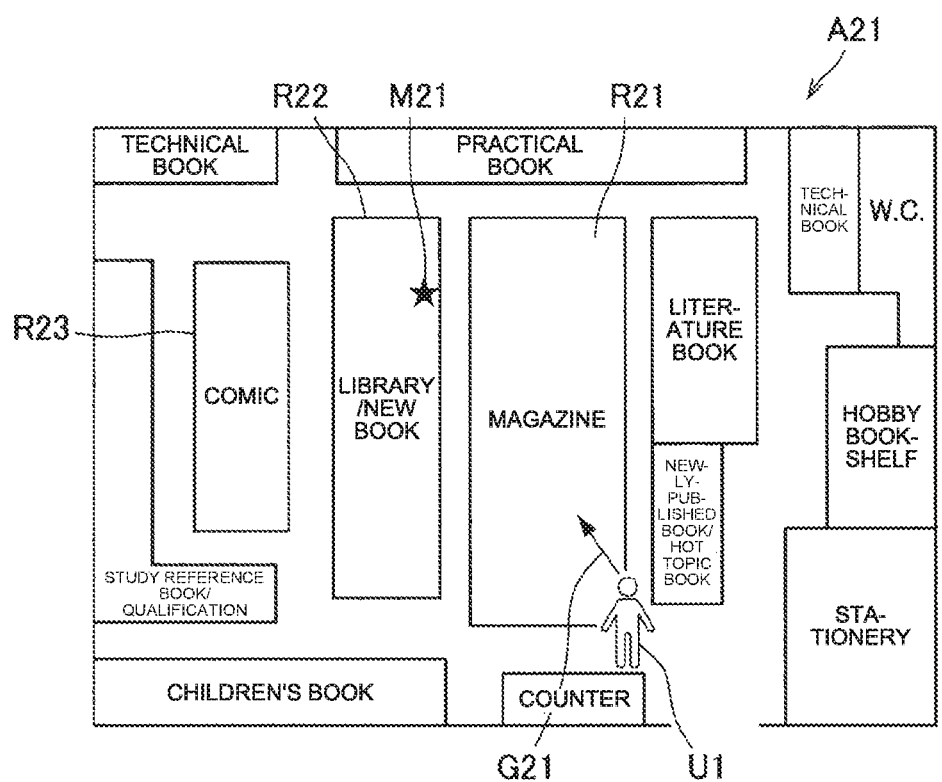
FIG. 9 is a view illustrating an example of a floor map as an example of map information.

FIG. 9 is a view illustrating an example of a floor map as an example of map information. Referring to FIG. 9, a floor map A21 is illustrated. The floor map A21 is drawn from a bird's eye view point. In addition, the floor map A21 is configured by associating genre names of books with latitude/longitude information of bookshelves on which the books are put. For example, real objects R21 to R23 (bookshelves) are drawn on the floor map A21. Note that a direction G21 of a line of sight of the user U1 is illustrated on the floor map A21.

The arrangement map of the books in the bookshelf is configured by associating genre names of the books, titles of the books, and positions of the books in the bookshelf (for example, XY coordinates in a horizontal direction and Z coordinates in a vertical direction) with each other. For example, a case where a title of the book that the user wants to search for is "BBB" and a genre of the book is "library/new book" is assumed. On the floor map A21, a position of the book of the genre "library/new book" and the title "BBB" is illustrated as the position of the book (position of the marker M21).

When the title "BBB" of the book is set as the name of the destination, the acquisition unit 142 acquires position information (latitude/longitude information) of a genre corresponding to the title "BBB" of the book from the floor map A21. In addition, the acquisition unit 142 acquires a position of the book of the title "BBB" in the bookshelf of the genre from the arrangement map of the books in the bookshelf. That is, latitude/longitude information of the book of the title "BBB" and the position of the book in the bookshelf are acquired by the acquisition unit 142.

In addition, the self-position estimation unit 141 estimates a position of the user (that is, a position of the information processing apparatus 10). Here, a case where the self-position estimation unit 141 estimates the position of the user on the basis of a reception result, in the information processing apparatus 10, of a beacon received from the access point in a case where the information processing apparatus 10 is connected to the access point is assumed. In such a case, the acquisition unit 142 acquires the position information (latitude/longitude information) of the user from the self-position estimation unit 141. Note that the position information of the user may be estimated on the basis of a reception result, in the access point, of a wireless signal transmitted from the information processing apparatus 10.

Then, the display control unit 143 adds a virtual object (first virtual object) to the position of the destination within the visual field of the user on the basis of the position information of the user and the position information (latitude/longitude information of the book of the title "BBB" and the position of the book in the bookshelf) of the destination. More specifically, the display control unit 143 may arrange the virtual object (first virtual object) at the position of the destination in an augmented reality space on the basis of the position information of the user, the position information of the destination, and the direction of the user detected by the geomagnetic sensor 132.

Figure 10:
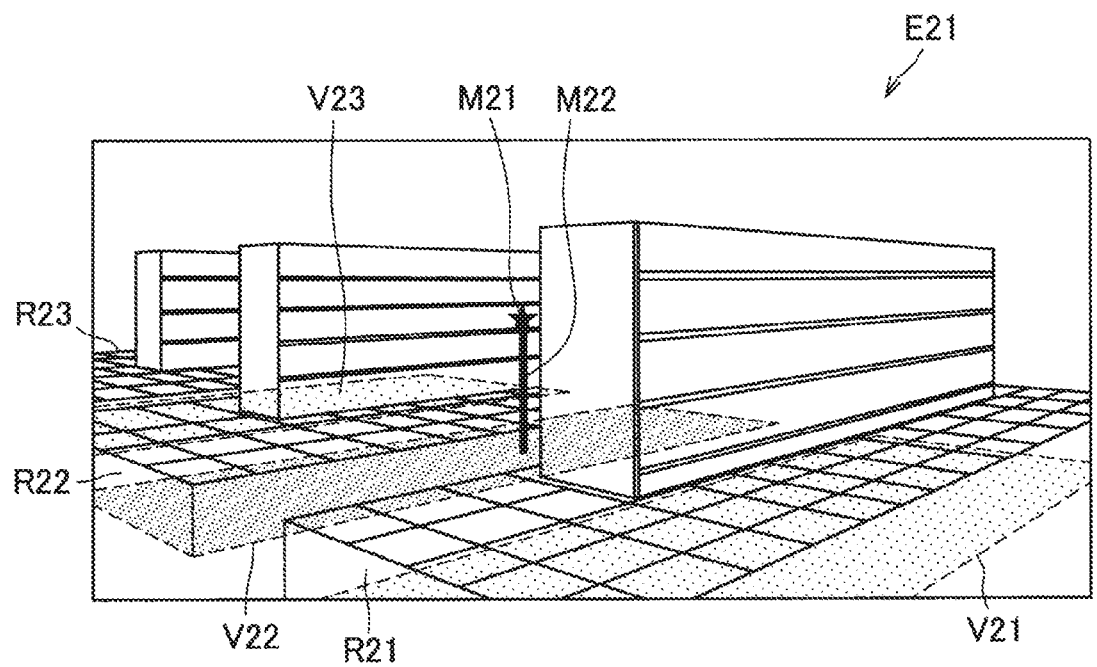
FIG. 10 is a view illustrating a display example of a virtual object.

FIG. 10 is a view illustrating a display example of a virtual object. Referring to FIG. 10, a real object R22 (bookshelf) which is set as a destination and on which books are put is illustrated in a visual field E21 of the user. In the manner as described above, a virtual object V22 is added to a position of the real object R22 (building) which is set as the destination and on which the books are put, by the display control unit 143. Therefore, a position of the destination can be intuitively grasped by a position of the virtual object V22. In addition, virtual objects V21 and V23 are also added to positions of real objects R21 and R23 (bookshelves) at points different from the destination by the display control unit 143.

In addition, referring to FIG. 10, the display control unit 143 causes a marker M21 to be displayed at the position of the book of the title "BBB" in the visual field P21 of the user on the basis of the position information of the user and the position information (latitude/longitude information of the book of the title "BBB" and the position of the book in the bookshelf) of the destination. The user can more accurately grasp the position of the book that he/she wants to search for by seeing this marker M21. Note that as illustrated in FIG. 10, the display control unit 143 may cause a marker M22 to be displayed from the position of the book of the title "BBB" in the visual field E21 of the user toward a floor surface.

[3.4. Addition of Virtual Object to Passing Point]

Note that there can also be a case where there is a passing point between the position of the user and the position of the destination. For example, in a case where the position of the user and the position of the destination exist on different floors, or the like, there can be a passing point such as a floor movement portion (for example, stairs, an escalator, an elevator, and the like) between the position of the user and the position of the destination. In such a case, if a virtual object is added to a position of the passing point within the visual field of the user instead of the position of the destination or in addition to the position of the destination, it helps the user to arrive at the destination. Therefore, in a case where the passing point is detected between the position of the user and the position of the destination, the display control unit 143 may add a virtual object (second virtual object) to the position of the passing point within the visual field of the user on the basis of position information of the user and position information of the passing point.

Figure 11:
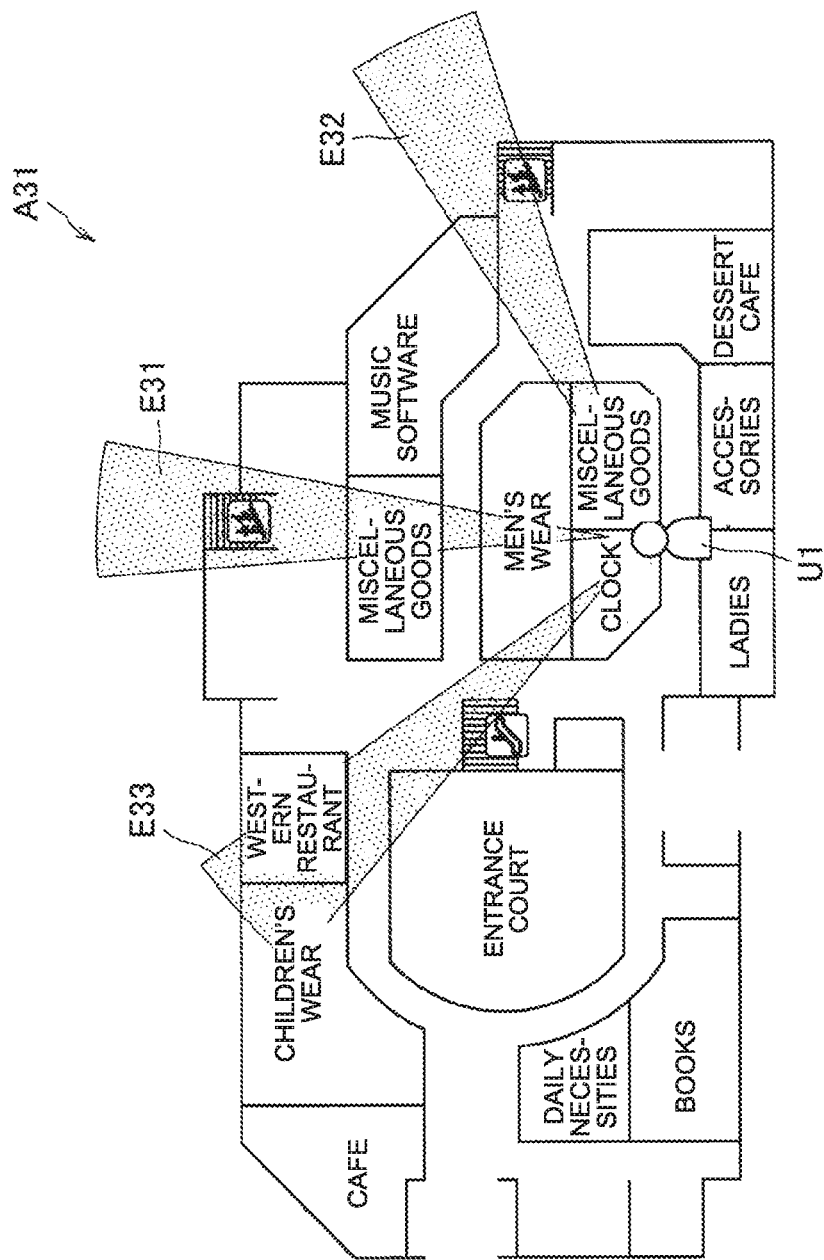
FIG. 11 is a view illustrating an example of a case where a position of a user and a position of a destination exist on different floors.

FIG. 11 is a view illustrating an example of a case where a position of a user and a position of a destination exist on different floors. Referring to FIG. 11, a floor map A31 is illustrated. Then, the user U1 is illustrated on the floor map A31. Here, a case where the position of the user and the position of the destination exist on different floors and the display control unit 143 has detected stairs at two places and an escalator at one place on a floor map A31, as illustrated in FIG. 11, on the basis of a plurality of floor maps is assumed. In such a case, it is preferable that the display control unit 143 adds virtual objects (second virtual objects) to positions of the stairs at the two places and a position of the escalator at the one place within the visual field of the user on the basis of position information of the user, the positions of the stairs at the two places, and the position of the escalator at the one place.

Referring to FIG. 11, stairs exist in each of a visual field E31 and a visual field E32, and an escalator exists in a visual field E33. Therefore, it is preferable to add virtual objects (second virtual objects) to the visual field E31, the visual field E32, and the visual field E33. At this time, it is preferable that the display control unit 143 increases brightness of these virtual objects by decreasing transparency of these virtual objects than transparency of the other virtual objects. Therefore, it becomes easier for the user to grasp the position of the passing point.

[3.5. Display in Area Unit]

Hereinabove, the example in which the virtual object is added to the position of the destination within the visual field of the user has been mainly described. However, a unit in which the virtual object is added may not be the position itself of the destination. For example, the unit in which the virtual object is added may be an area including the destination. That is, the display control unit 143 may add the virtual object (first virtual object) to the area including the destination within the visual field of the user. At this time, the display control unit 143 may control a size of the area on the basis of a relationship between the position of the user and the position of the destination.

Figure 12:
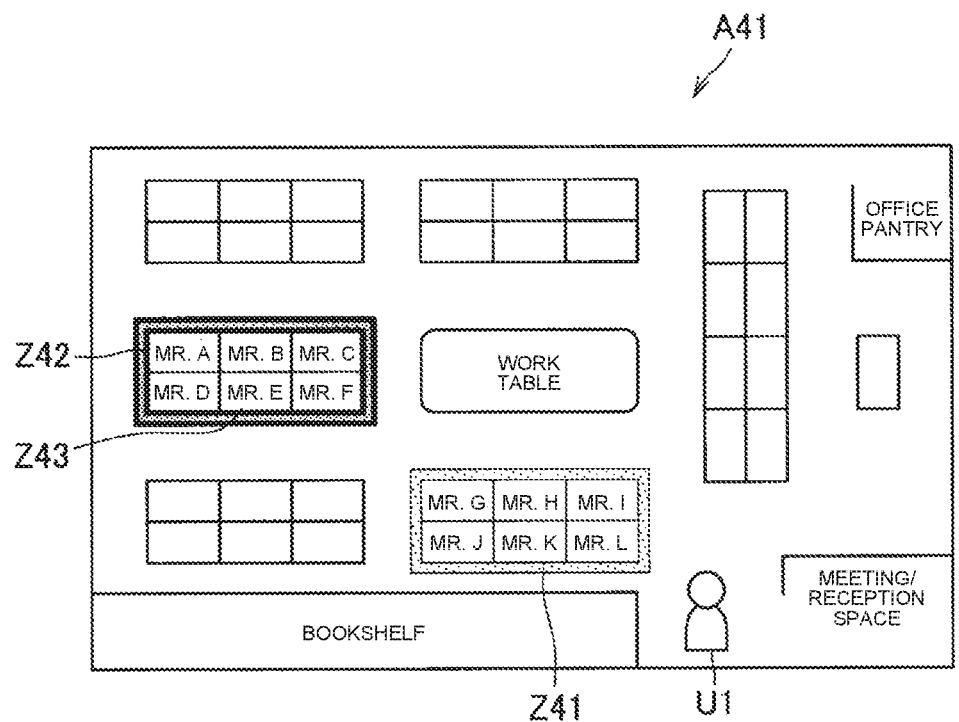
FIG. 12 is a view illustrating an example in which a virtual object is added to an area including the destination.

FIG. 12 is a view illustrating an example in which a virtual object is added to an area including the destination. Referring to FIG. 12, a floor map A41 is illustrated. The floor map A41 is configured by associating names of employees, position information of seats, and units to which employees belong with each other. Then, the user U1 is illustrated on the floor map A41. Here, a case where a name of Mr. E is set as the destination is assumed. In such a case, the acquisition unit 142 acquires position information of seats of employees belonging to the same unit as a unit to which Mr. E belongs together with position information Z43 of a seat of Mr. E, which is the destination. Here, a case where the acquisition unit 142 also acquires position information of seats of Mr. A, Mr. B, Mr. C, Mr. D, and Mr. F as the employees belonging to the same unit as the unit to which Mr. E belongs is assumed.

At this time, the display control unit 143 may set the position of the seat of the destination "Mr. E" and the positions of the seats of Mr. A, Mr. B, Mr. C, Mr. D, and Mr. F belonging to the same unit as the user to which the destination. "Mr. E" belongs as one area Z42 and add a virtual object to the area Z42, within a visual field of the user. Note that, referring to FIG. 12, a virtual object is also added to an area Z41 of a passing point within the visual field of the user by the display control unit 143. However, as illustrated in FIG. 12, transparency of the virtual object added to the area Z41 of the passing point is preferably lower than that of the virtual object added to the area Z42 including the destination. Therefore, the area Z42 including the destination is displayed brighter.

In addition, the display control unit 143 may control a size of the area including the destination on the basis of a relationship between the position of the user and the position of the destination. For example, in a case where a distance or a journey between the position of the user and the position of the destination from a floor map is acquired by the acquisition unit 142, the display control unit 143 may decrease the size of the area including the destination as the distance or the journey between the position of the user and the position of the destination becomes smaller.

For example, the display control unit 143 may change the area in the order of a department unit, a section unit, and a team unit as the distance or the journey between the position of the user and the position of the destination is decreased. Alternatively, in a case where the user exists outdoors, the display control unit 143 may change the area in the order of a town unit, a house number unit, a street corner, and the like, as the distance or the journey between the position of the user and the position of the destination is decreased. Alternatively, in a case where the user exists in a department store, the display control unit 143 may change the area in the order of a fresh food section, a vegetable section, and an apple section as the distance or the journey between the position of the user and the position of the destination is decreased.

[3.6. Another Example of Indoor User]

In the example described above, the case where the user exists in the bookstore has been described as an example of the case where the user exists indoors. In addition, various examples are assumed as an example in which the user exists indoors. For example, a case where the user exists inside a house that can be seen at a condominium preview is assumed as an example in which the user exists indoors in such a case, if a floor map is configured by associating names of rooms with position information of each of the rooms and passages, similar to a case where the virtual object is added to the position of the book in a visual field of the user, virtual objects can be added to positions of the rooms and the passages in the visual field of the user.

Figure 13:
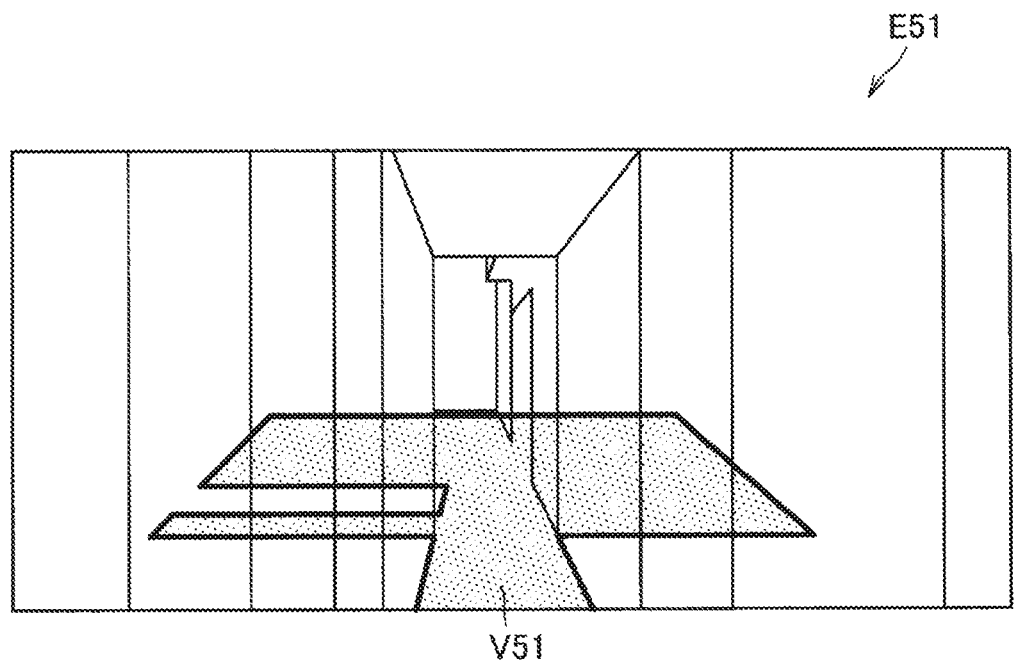
FIG. 13 is a view illustrating a display example of a virtual object.

FIG. 13 is a view illustrating a display example of a virtual object. Referring to FIG. 13, a case where the user is participating in a condominium preview and an inside of a house exists in a visual field E51 of the user is illustrated. A case where position information of each of rooms and passages has been acquired from the floor map by the acquisition unit 142 is assumed. In such a case, the display control unit 143 can add a virtual object V51 to positions of the rooms and the passages within the visual field of the user on the basis of position information of the user and the position information of each of the rooms and the passages.

[3.7. Application to Virtual Space]

Figure 14:
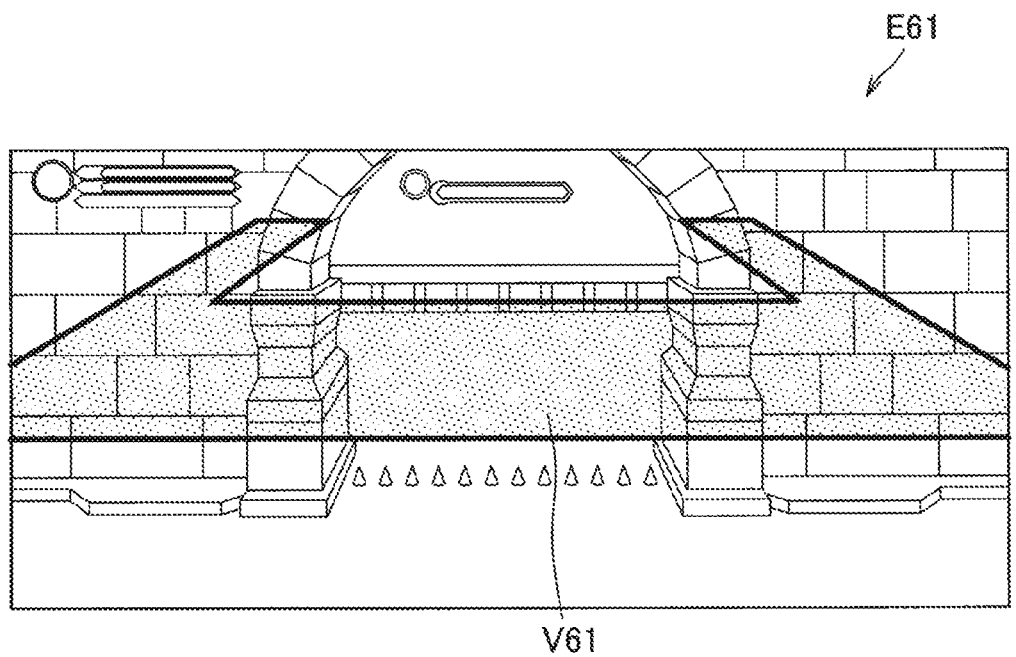
FIG. 14 is a view illustrating an application example to a virtual space.

Hereinabove, the example of arranging the virtual object in the augmented reality space has been mainly described. However, similar to the example of arranging the virtual object in the augmented reality space, a virtual object can be arranged in a virtual space. FIG. 14 is a view illustrating an application example to a virtual space. Referring to FIG. 14, a virtual space is provided to a visual field E61 of the user by executing a game application. For example, in the game application, position information of each point is stored. The display control unit 143 can add a virtual object V61 to a position of a point (passage or the like) in a visual field E61 of the user on the basis of position information of the user and position information of the point (passage or the like).

[3.8. Specific Example of Control of Transparency]

Next, a specific example of control of transparency of a virtual object will be described. As described above, the display control unit 143 may control the transparency of a predetermined virtual object within the visual field of the user on the basis of the position information of the user. Here, the display control unit 143 can add a virtual object (third virtual object) to a position of a point different from a destination within the visual field of the user. At this time, the display control unit 143 can control transparency of the virtual object added to the position of the point different from the destination as the predetermined virtual object on the basis of the position information of the user and position information of the point.

As an example, the display control unit 143 may control the transparency of the virtual object added to the position of the point different from the destination on the basis of a distance between the position of the user and the position of the point. Such control of the transparency of the virtual object will be described with reference to FIGS. 15 and 16.

Figure 15:
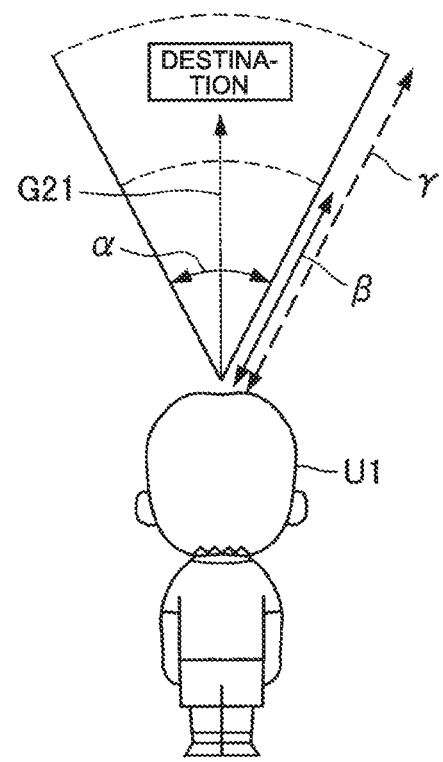
FIG. 15 is a views for describing a control example of transparency of a virtual object.

FIG. 15 is a view for describing a control example of transparency of virtual object. Referring to FIG. 15, the user U1 existing in a real space is illustrated, and a direction from a position of the user U1 to a position of a destination is illustrated as a destination direction G21. In addition, referring to FIG. 15, a threshold $\alpha$ of an angle set based on the destination direction is illustrated, and a threshold $\beta$ (third threshold) of a distance and a distance threshold $\gamma$ (fourth threshold) set based on the position of the user U1 are illustrated.

Figure 16:
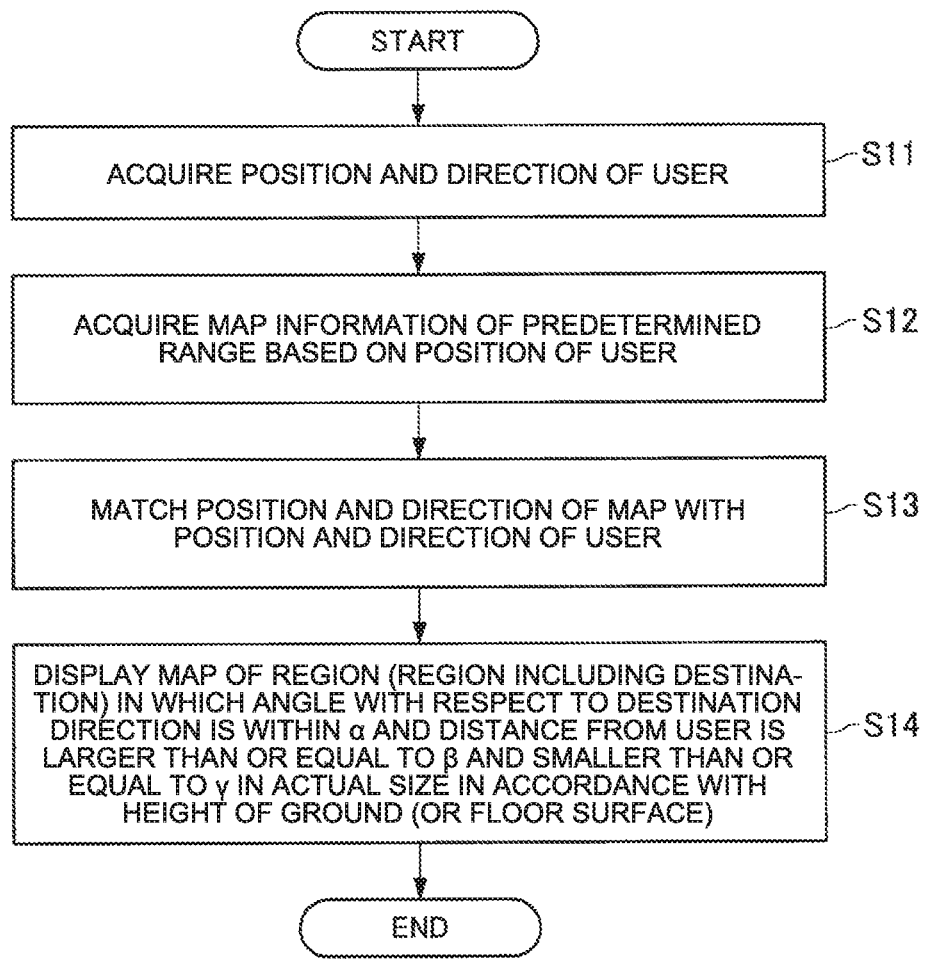
FIG. 16 is a flowchart illustrating an operation example of control of the transparency of the virtual object.

FIG. 16 is a flowchart illustrating an operation example of control of the transparency of the virtual object. As illustrated in FIG. 16, the acquisition unit 142 acquires a position and a direction of the user (S11). In addition, the acquisition unit 142 acquires map information of a predetermined range based on the position of the user (S12). Here, it is preferable that the map information acquired by the acquisition unit 142 includes at least a region of a map displayed in S14. Subsequently, the display control unit 143 matches a position and a direction of the map acquired by the acquisition unit 142 with the position and the direction of the user in an augmented reality space.

Subsequently, the display control unit 143 displays a map of a region (region including the destination) in which an angle with respect to the destination direction is within the threshold $\alpha$ and a distance from the user is larger than or equal to the threshold $\beta$ and smaller than or equal to the threshold $\beta$ in an actual size in accordance with a height of the ground (or a floor surface) (S14) when the position and the direction of the map acquired by the acquisition unit 142 are matched with the position and the direction of the user. More specifically, the display control unit 143 arranges a map of an actual size in accordance with the height of the ground (or the floor surface), in the augmented reality space.

As described above, according to the embodiment of the present disclosure, the map of the predetermined range is presented to the user. For this reason, according to the embodiment of the present disclosure, it becomes possible for the user to easily find the destination in the map, as compared with a case where the map is presented to the user uniformly in all azimuths.

Figure 17:
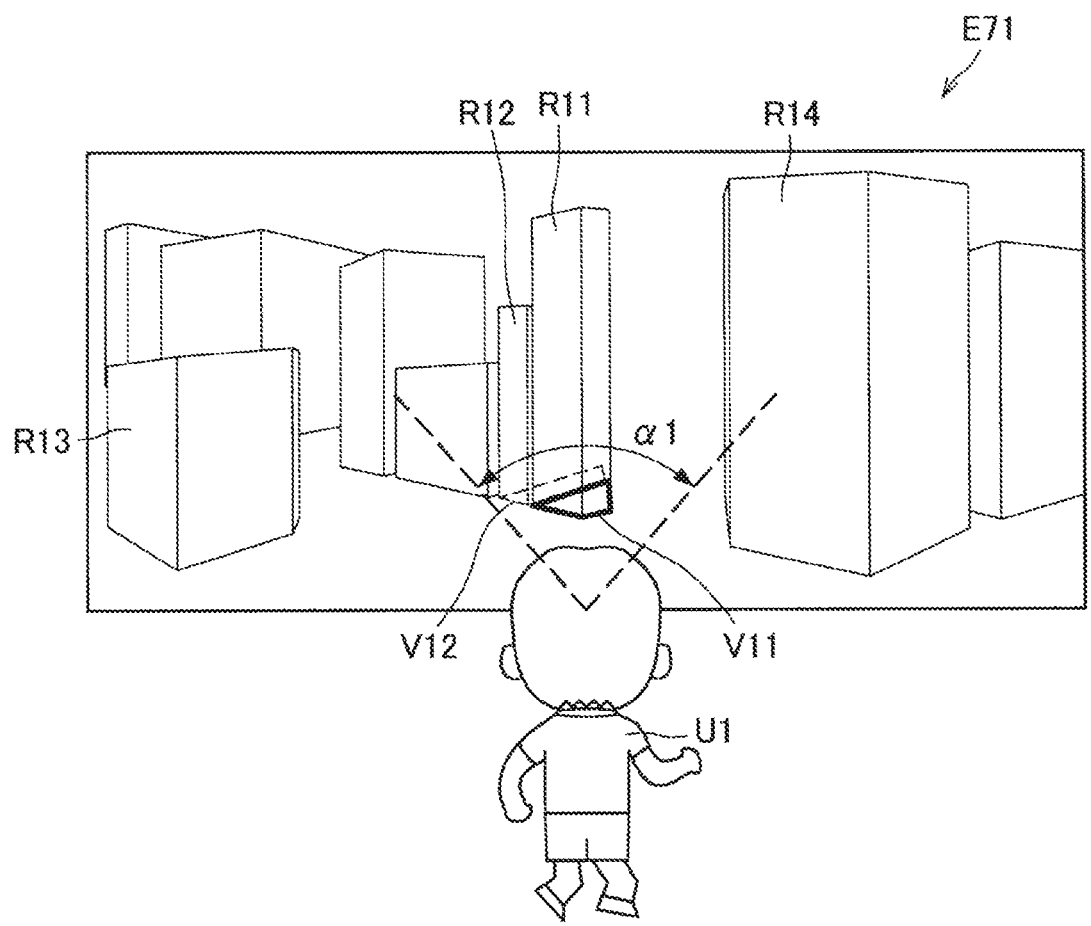
FIG. 17 is a views for describing a control example of a threshold of an angle.
Figure 18:
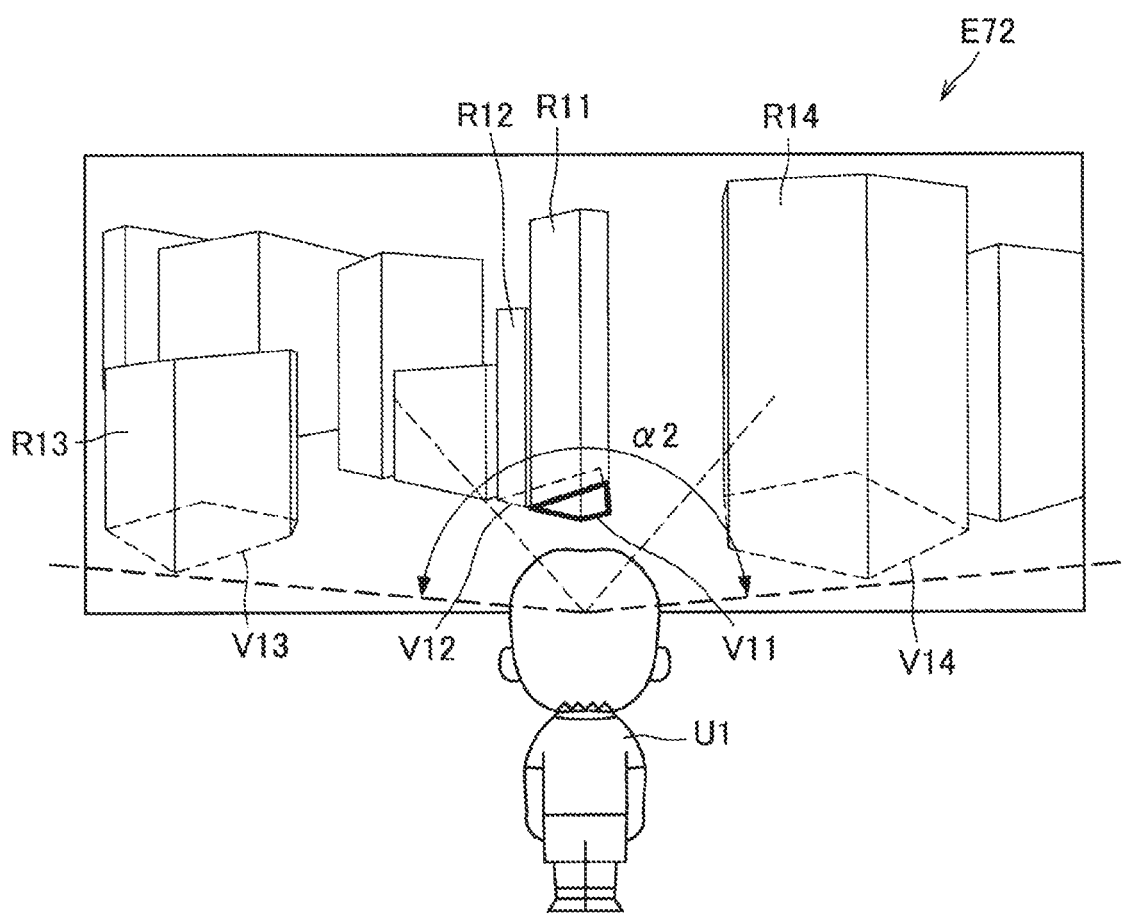
FIG. 18 is a view for describing a control example of a threshold of an angle.
Figure 19:
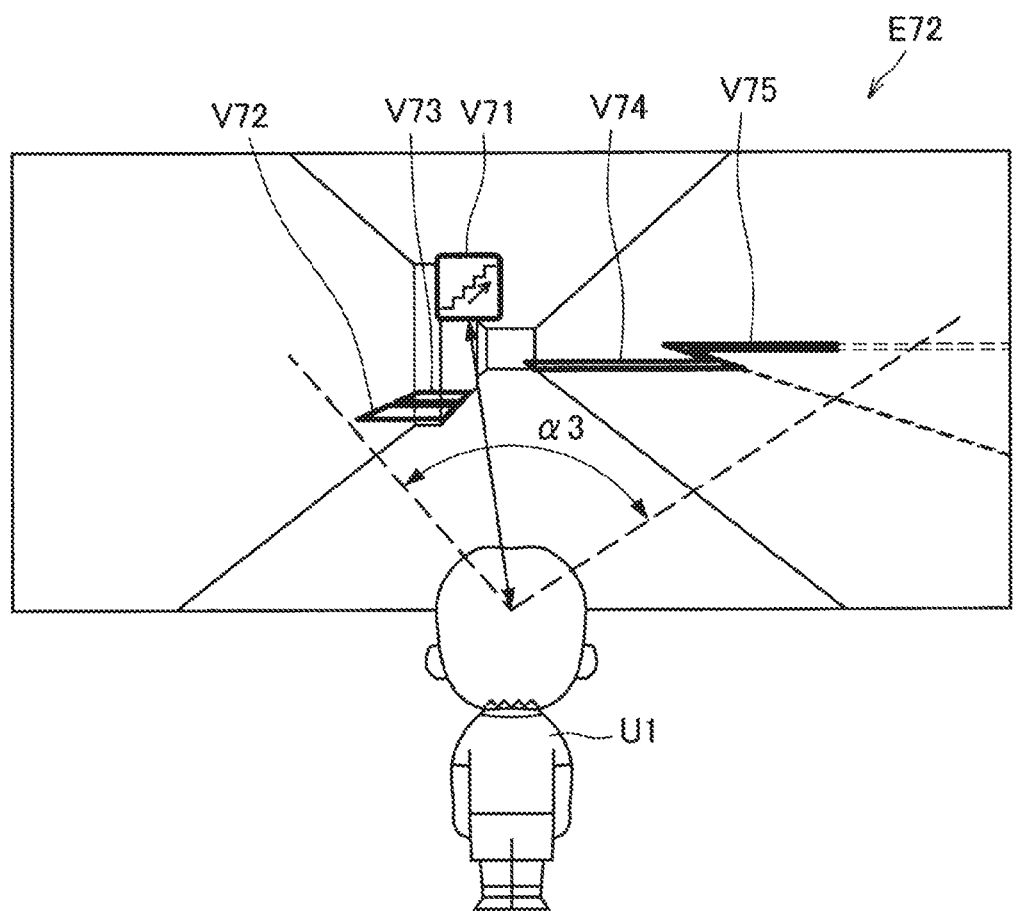
FIG. 19 is a view for describing a control example of a threshold of an angle.

Next, examples of controlling a threshold $\alpha$ of an angle will be described with reference to FIGS. 17 to 19. FIGS. 17 to 19 are views for describing a control example of a threshold $\alpha$ of an angle. Referring to FIG. 17, real objects R11 to R14 existing in a real space exist in a visual field E71. Similar to the example described above, a case where the real object R11 (building) is set as a destination is assumed. Therefore, the real objects R12 to R14 (buildings) correspond to points different from the destination.

The display control unit 143 controls transparency of virtual objects added to the real objects R12 to R14 (buildings) in the visual field E71 on the basis of a direction from a position of the user U1 to a position of the real object R11 (building) set as the destination and the real objects R12 to R14 (buildings) different from the destination. For example, the display control unit 143 controls the transparency of the virtual objects added to the real objects R12 to R14 (buildings) different from the destination according to whether or not the real objects R12 to R14 (buildings) different from the destination exist in a range within the threshold $\alpha$ of the angle based on the direction from the position of the user U1 to the position of the real object R11 (building) set as the destination.

Here, for example, the threshold $\alpha$ of the angle may be controlled by the display control unit 143 on the basis of whether or not the user U1 is moving. Here, it may be determined in any manner whether or not the user U1 is moving. As an example, the display control unit 143 may determine whether or not the user U1 is moving, according to whether or not there is a motion in an image captured by the environment recognition imaging unit 110. For example, it is assumed that the user U1 cannot see a wide range in a case where the user U1 is moving as compared with a case where the user U1 is being stopped. Therefore, it is preferable that the display control unit 143 decreases the threshold $\alpha$ of the angle in a case where the user U1 is moving as compared with a case where the user U1 is being stopped.

In the example illustrated in FIG. 17, the user U1 is moving. On the other hand, in the example illustrated in FIG. 18, the user U1 is being stopped. Therefore, referring to FIGS. 17 and 18, a threshold $\alpha 1$ of the angle in a case where the user U1 is moving is smaller than a threshold $\alpha 2$ of the angle in a case where the user U1 is being stopped.

As a result, in the example illustrated in FIG. 17, the real objects R13 and R14 (buildings) different from the destination do not exist in a range within the threshold $\alpha 1$ of the angle based on the direction from the position of the user U1 to the position of the real object R11 (building) set as the destination. For this reason, the display control unit 143 makes transparency of virtual objects added to positions of the real objects R13 and R14 (buildings) higher in the visual field E71 (in the example illustrated in FIG. 17, the transparency is 100%, and thus, the virtual objects cannot be visually recognized).

On the other hand, in the example illustrated in FIG. 18, the real objects R13 and R14 (buildings) different from the destination exist in a range within the threshold α2 or the angle based on the direction from the position of the user U1 to the position of the real object R11 (building) set as the destination. For this reason, the display control unit 143 makes transparency of virtual objects added to positions of the real objects R13 and R14 (buildings) lower in a visual field E72 (in the example illustrated in FIG. 18, the transparency is smaller than 100%, and thus, the virtual objects can be visually recognized).

Alternatively, the threshold α of the angle may be controlled by the display control unit 143 on the basis of a distance between the position of the user U1 and a position of a wall surface. Here, the distance between the position of the user U1 and the position of the wall surface may be acquired in any manner. As an example, the display control unit 143 may acquire the distance between the position of the user U1 and the position of the wall surface on the basis of the image captured by the environment recognition imaging unit 110. For example, it is assumed that a position on which information is required for the user U1 is biased toward an opposite side to the wall surface in a case where the distance between the position of the user U1 and the position of the wall surface is smaller than a certain distance as compared with a case where the distance between the position of the user U1 and the position of the wall surface is larger than the certain distance. Therefore, it is preferable that the display control unit 143 shifts the threshold α of the angle to the opposite side to the wall surface in the case where the distance between the position of the user U1 and the position of the wall surface is smaller than the certain distance as compared with the case where the distance between the position of the user U1 and the position of the wall surface is larger than the certain distance.

In the example illustrated in FIG. 19, a distance between the position of the user U1 and a position of a wall surface on a left side of the user U1 is small. Therefore, a threshold α3 of the angle is shifted to the opposite side (right side) from the wall surface as compared with the threshold α of the angle in the case where the distance between the position of the user U1 and the position of the wall surface is larger than the certain distance.

As a result, in the example illustrated in FIG. 19, transparency of a virtual object V74 added to a position of a passage on the opposite side to the wall surface in the visual field E72 is decreased (the virtual object V74 becomes bright), and transparency of a virtual object V75 added to a position on the opposite side to the wall surface in the visual field V72 is also decreased (the virtual object V75 becomes also bright).

Note that referring to FIG. 19, transparency of a virtual object V71 added to a position of stairs which is a passing point to the destination in the visual field E72 is decreased (the virtual object V71 becomes bright), and transparency of a virtual object V72 added to a position of a restroom in the visual field E72 is decreased (the virtual object V72 becomes bright). Here, an icon indicating the stairs is used as the virtual object V71. That is, in the embodiment of the present disclosure, a type of the virtual object is not particularly limited.

Figure 20:
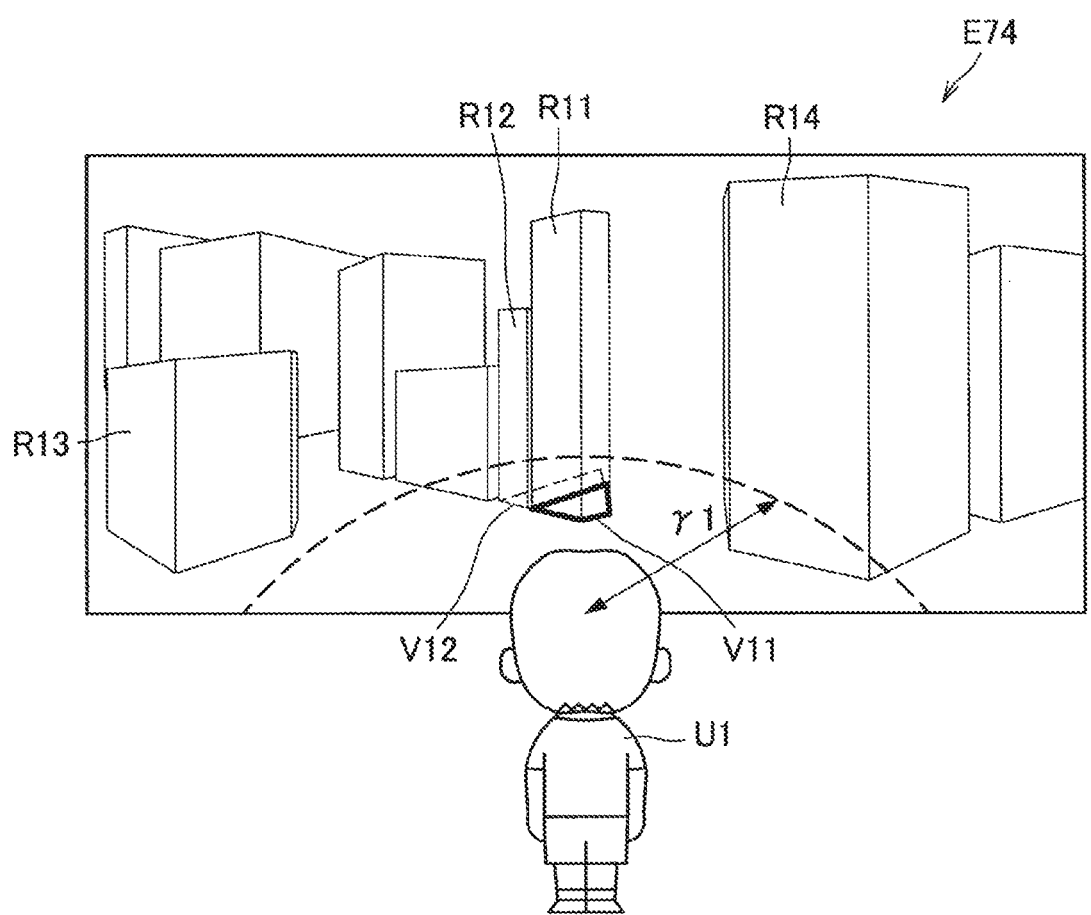
FIG. 20 is a view for describing a control example of a distance threshold.
Figure 21:
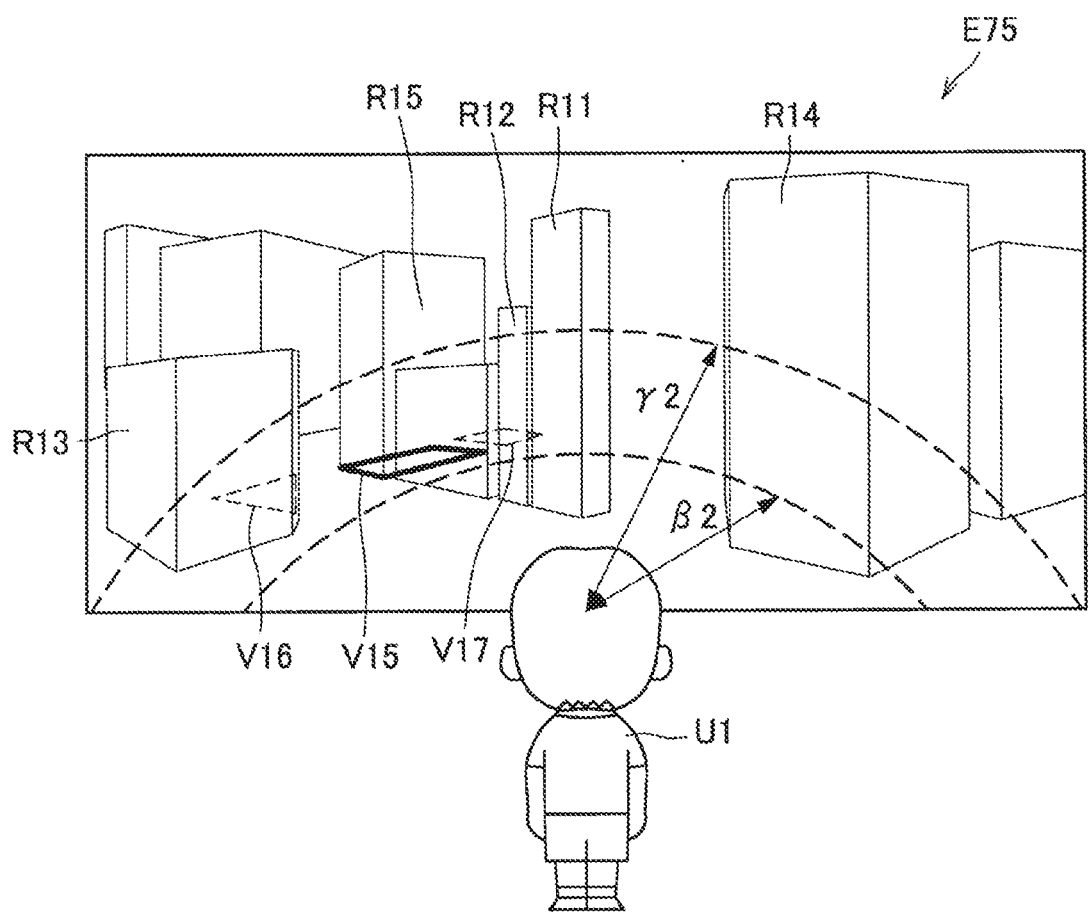
FIG. 21 is a view for describing a control example of a distance threshold.

Next, examples of controlling a threshold β of a distance and a threshold γ of a distance will be described with reference to FIGS. 20 and 21. FIGS. 20 and 21 are views for describing control examples of a threshold β of a distance and a threshold γ of a distance. Referring to FIG. 20, real objects R11 to R14 existing in a real space exist in a visual field E74. Similar to the example described above, a case where the real object R11 (building) is set as a destination is assumed. Therefore, the real objects R12 to R14 (buildings) correspond to points different from the destination. On the other hand, referring to FIG. 21, a case where real objects R11 to R14 existing in a real space exist in a visual field E75, but a real object R15 (building) is set as a destination is assumed.

For example, the display control unit 143 may increase transparency of a virtual object added to a real object different from the destination in a case where a distance between a position of the user U1 and a position of the real object different from the destination is smaller than a threshold β of a distance as compared with the case where the distance is larger than the threshold β of the distance. In addition, the display control unit 143 may increase the transparency of the virtual object added to the real object different from the destination in a case where the distance between the position of the user U1 and the position of the point is larger than a threshold γ of a distance as compared with the case where the distance is smaller than the threshold γ of the distance.

Here, for example, the threshold β of the distance may be controlled by the display control unit 143 on the basis of a distance between the position of the user U1 and a position of the destination. For example, it is assumed that the user U1 wants to see a distance place in a case where the distance between the position of the user U1 and the position of the destination as larger than a certain distance as compared with a case where the distance between the position of the user U1 and the position of the destination is smaller than the certain distance. Therefore, it is preferable that the display control unit 143 increases the threshold β of the distance in the case where the distance between the position of the user U1 and the position of the destination is larger than the certain distance as compared with the case where the distance between the position of the user U1 and the position of the destination is smaller than the certain distance.

In addition, the threshold γ of the distance may also be controlled by the display control unit 143 on the basis of the distance between the position of the user U1 and the position of the destination. At this time, for a similar reason, it is preferable that the display control unit 143 increases the threshold γ of the distance in the case where the distance between the position of the user U1 and the position of the destination is larger than a certain distance as compared with the case where the distance between the position of the user U1 and the position of the destination is smaller than the certain distance.

In the example illustrated in FIG. 20, the distance between the real object R11 set as the destination and the user U1 is small. On the other hand, in the example illustrated in FIG. 21, the distance between the real object R15 set as the destination and the user U1 is large. Therefore, referring to FIGS. 20 and 21, a threshold γ1 of the distance in a case where the destination is close to the user is smaller than a threshold γ2 of the distance in a case where the destination is distant from the user. Note that in FIG. 21, a threshold β2 of the distance in a case where the destination and the user are close to each other is illustrated, but in FIG. 20, the threshold β of the distance in a case where the destination and the user are close to each other becomes zero, and is not illustrated.

As a result, in the example illustrated in FIG. 20, the real objects R13 and R14 (buildings) different from the destination do not exist at a position to which a distance from the position of the user U1 is smaller than the threshold γ1. For this reason, the display control unit 143 makes transparency of virtual objects added to positions of the real objects R13 and R14 (buildings) higher in the visual field E71 (in the example illustrated in FIG. 20, the transparency is 100%, and thus, the virtual objects cannot be visually recognized). In addition, the real object R12 (building) different from the destination exists at the position to which the distance from the position of the user U1 is smaller than the threshold γ1. For this reason, the display control unit 143 makes transparency of a virtual object added to a position of the real object R12 (building) lower in the visual field E74.

On the other hand, in the example illustrated in FIG. 21, the real object R11 (building) different from the destination does not exist at a position to which the distance from the position of the user U1 is smaller than the threshold β2. For this reason, the display control unit 143 makes transparency of a virtual object added to a position of the real object R11 (building) higher in the visual field E75 (in the example illustrated in FIG. 21, the transparency is 100%, and thus, the virtual object cannot be visually recognized). In addition, real objects (buildings) different from the destination (hidden behind a front building) exists at a position to which the distance from the position of the user U1 is larger than the threshold β2 and smaller than the threshold γ2. For this reason, the display control unit 143 makes transparency of virtual objects V16 and V17 added to positions of the real objects (buildings) lower in the visual field E75.

Note that the display control unit 143 may control the threshold β of the distance on the basis of whether or not the position of the user U1 is outdoors. For example, the display control unit 143 may increase the threshold β of the distance in a case where the position of the user U1 is outdoors as compared with a case where the position of the user U1 is indoors. Similarly, the display control unit 143 may control the threshold γ of the distance on the basis of whether or not the position of the user U1 is outdoors. For example, the display control unit 143 may increase the threshold γ of the distance in a case where the position of the user U1 is outdoors as compared with a case where the position of the user U1 is indoors.

[3.9. In Case Where There are a Plurality of Destinations]

Next, a case where there are a plurality of destinations will be described with reference to FIGS. 22 to 25. Hereinabove, the case where one destination is set has been mainly described. However, there can also be a case where a plurality of destinations are set. Therefore, the display control unit 143 may add virtual objects (first virtual objects) to positions of each of the plurality of destinations within a visual field of the user in a case where position information of the plurality of destinations is acquired by the acquisition unit 142. Then, the display control unit 143 may control transparency of the virtual objects (first virtual objects) added to the positions of each of the plurality of destinations as predetermined virtual objects. Note that the display control unit 143 may delete a virtual object added to a position of a destination at which the user has arrived in a case where the user has arrived at any of the plurality of destinations.

FIGS. 22 to 25 are views illustrating examples of a case where there are a plurality of destinations. In the examples illustrated in FIGS. 22 and 23, a case where a real object R11 (building) and a real object R15 (building) are set as destinations is assumed. In such a case, the display control unit 143 adds a virtual object V11 to a position of the real object R11 (building) and adds a virtual object V15 to a position of the real object R15 (building), in a visual field E76.

Figure 22:
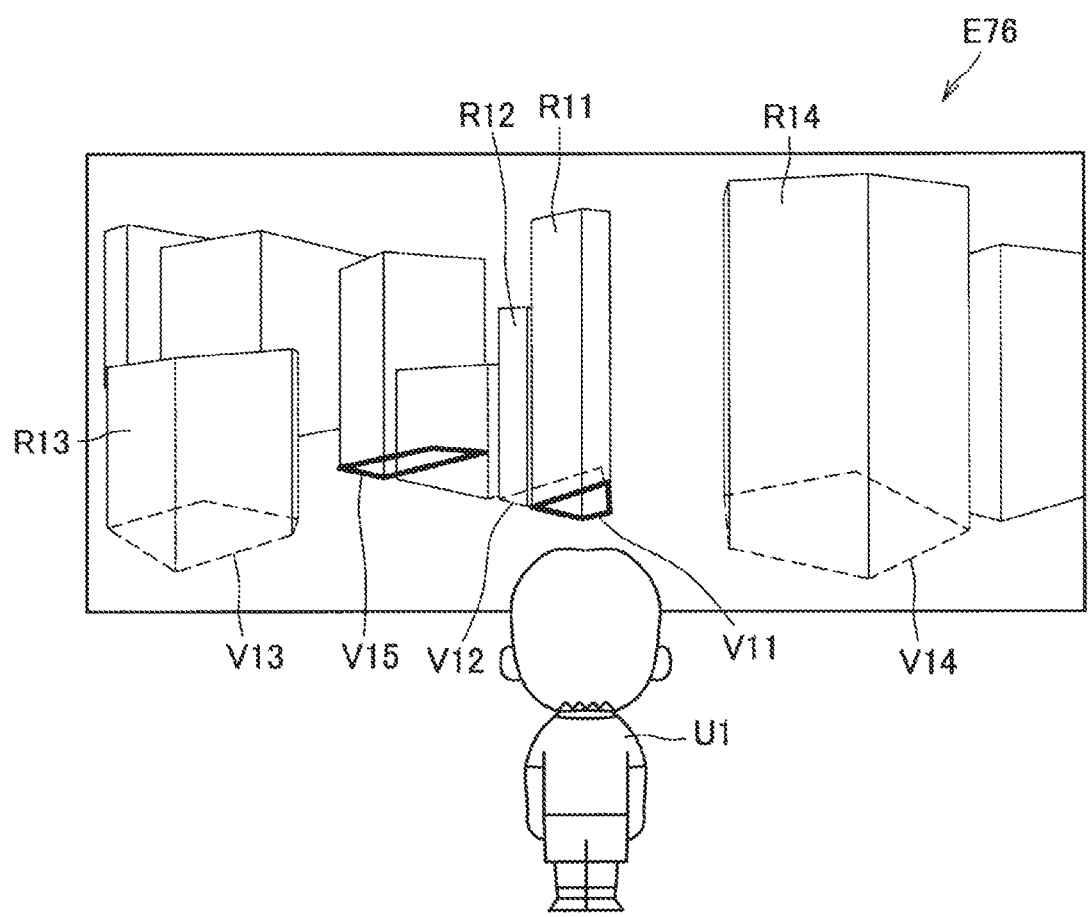
FIG. 22 is a view illustrating an example of a case where there are a plurality of destinations.
Figure 23:
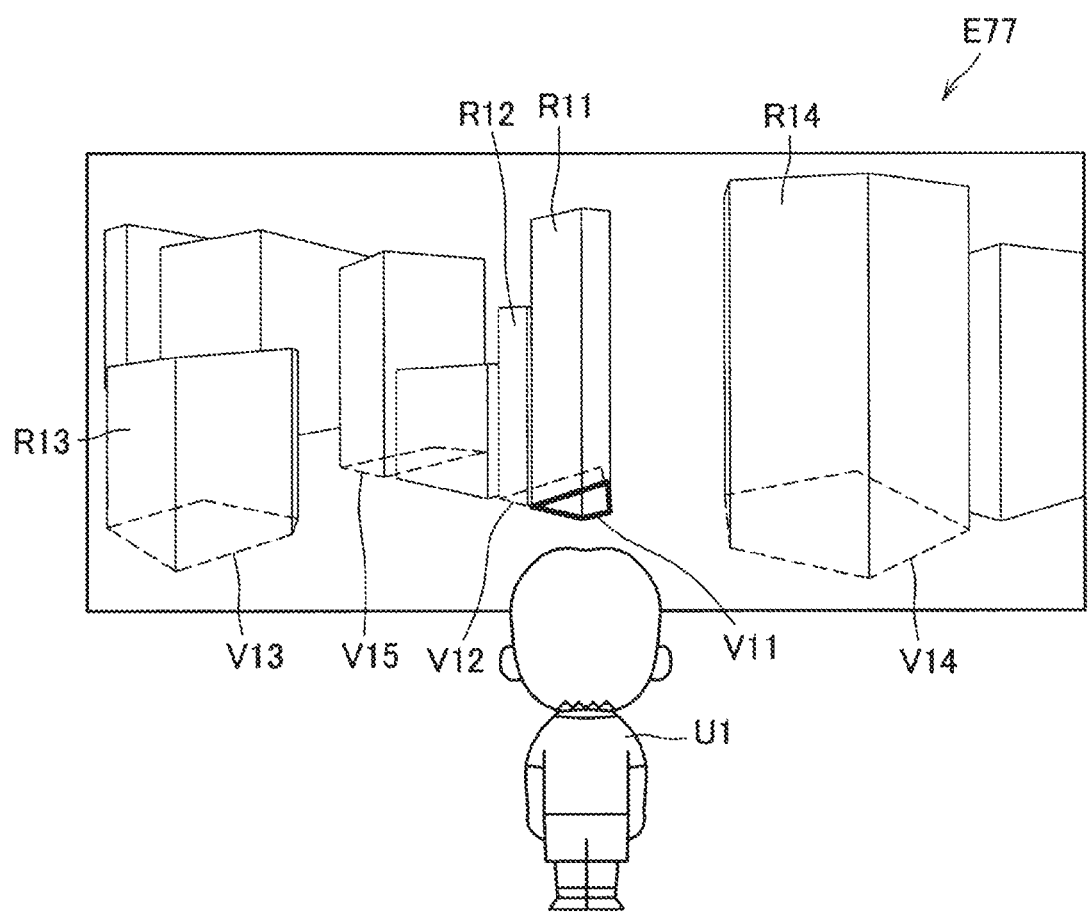
FIG. 23 is a view illustrating an example of a case where there are a plurality of destinations.

For example, as illustrated in FIG. 22, a case where a distance between the real object R11 (building) and the real object R15 (building) set as the destinations and a position of the user is larger than a certain distance is assumed. In such a case, the display control unit 143 may make transparency of the virtual object V11 added to the real object R11 (building) and transparency of the virtual object V15 added to the real object R15 (building) the same as each other, in the visual field E76.

Alternatively, a case where the real object R11 (building) of the real object R11 (building) and the real object R15 (building) set as the destinations is closer to the user than the real object R15 (building) is, is assumed. In such a case, the display control unit 143 may make transparency of the virtual object V11 added to the real object R11 (building) closer to the user lower than transparency of the virtual object V11 added to the real object R11 (building) more distant from the user.

Figure 24:
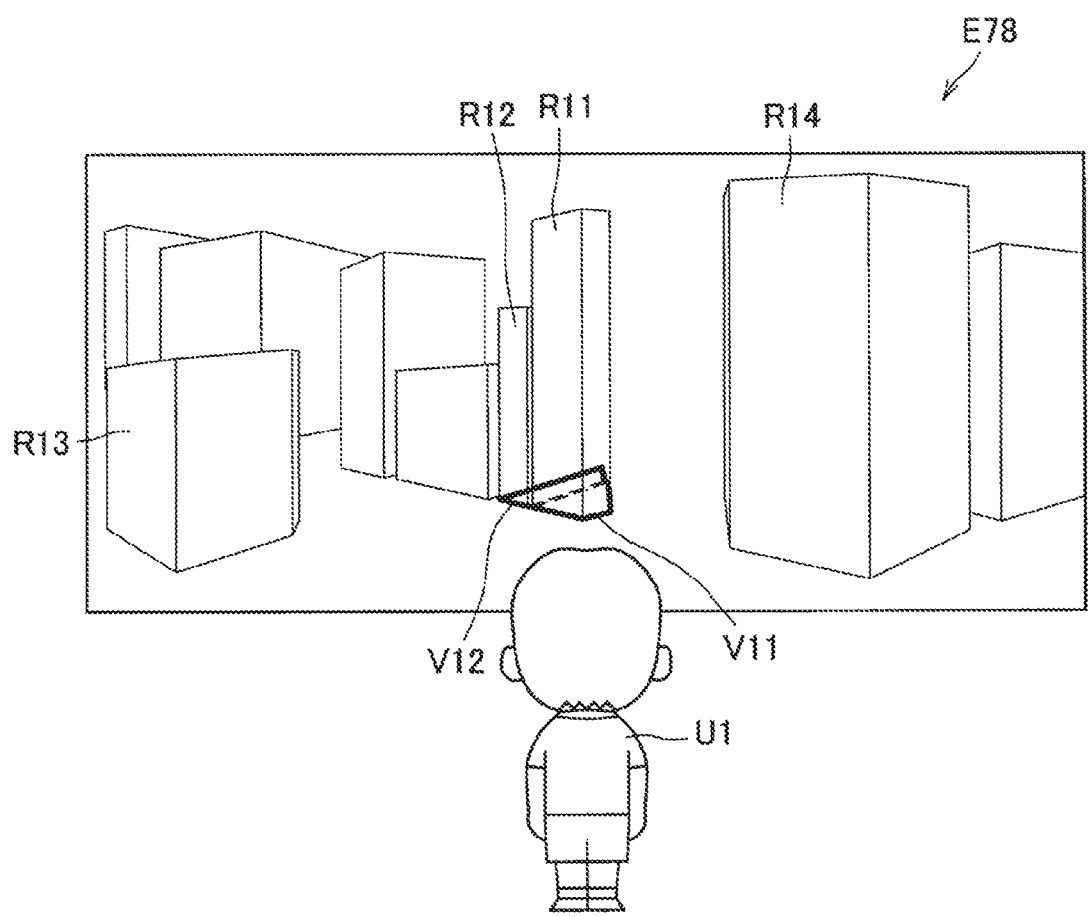
FIG. 24 is a view illustrating an example of a case where there are a plurality of destinations.
Figure 25:
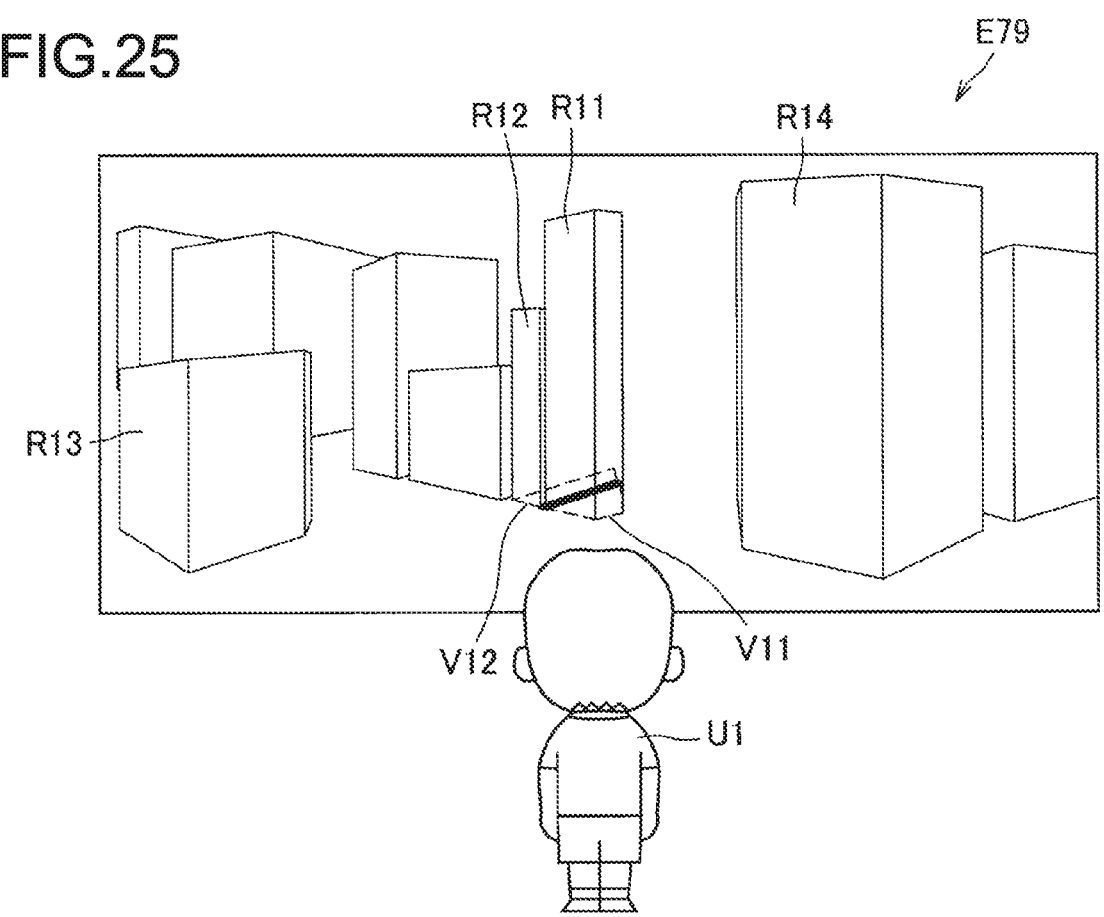
FIG. 25 is a view illustrating an example of a case where there are a plurality of destinations.

In the examples illustrated in FIGS. 24 and 25, a case where a real object R11 (building) and a real object R12 (building) are set as destinations is assumed. In such a case, the display control unit 143 adds a virtual object V11 to a position of the real object R11 (building) and adds a virtual object 12 to a position of the real object R12 (building), in a visual field E78. However, a case where a distance between the position of the real object R11 (building) set as the destination and the position of the real object R12 (building) set as the destination is smaller than a certain distance is assumed.

In such a case, as illustrated in FIG. 24, the display control unit 143 may increase transparency of portions close to each other in each of the virtual object V11 added to the real object R11 (building) and the virtual object V12 added to the real object R12 (building), in the visual field E78. Alternatively, as illustrated in FIG. 25, the display control unit 143 may decrease transparency of portions close to each other in each of the virtual object V11 added to the real object R11 (building) and the virtual object V12 added to the real object R12 (building), in a visual field E79. Therefore, it becomes easy to distinguish the two destinations from each other.

[3.10. Display of Distance to Destination]

Figure 26:
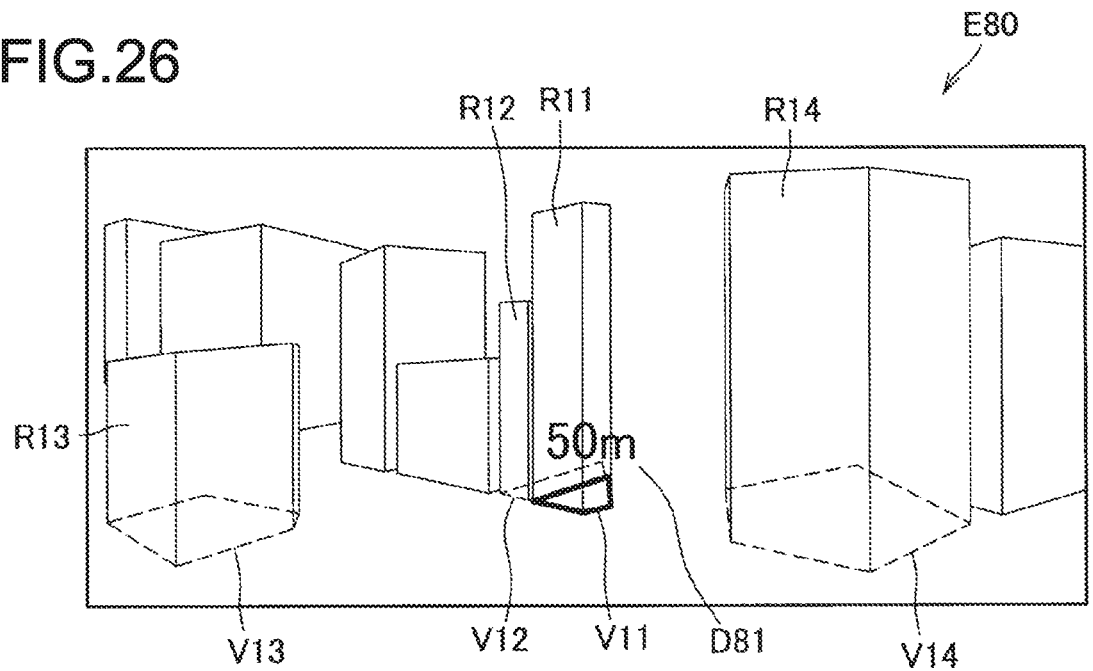
FIG. 26 is a view illustrating a presentation example of a distance between a position of a user and a position of a destination.

Hereinabove, the case where the distance between the position of the user and the position of the destination is not particularly presented to the user has been described. However, the distance between the position of the user and the position of the destination may be presented to the user. FIG. 26 is a view illustrating a presentation example of a distance between a position of a user and a position of a destination. Referring to FIG. 26, the display control unit 143 displays a distance D81 between the real object R11 set as the destination and the position of the user in a visual field E80. Note that instead of the distance between the position of the user and the position of the destination or in addition to the distance between the position of the user and the position of the destination, a time required for the user to arrive at the destination may be displayed or an estimated time at which the user will arrive at the destination may be displayed.

[3.11. In Case of Using Train]

Figure 27:
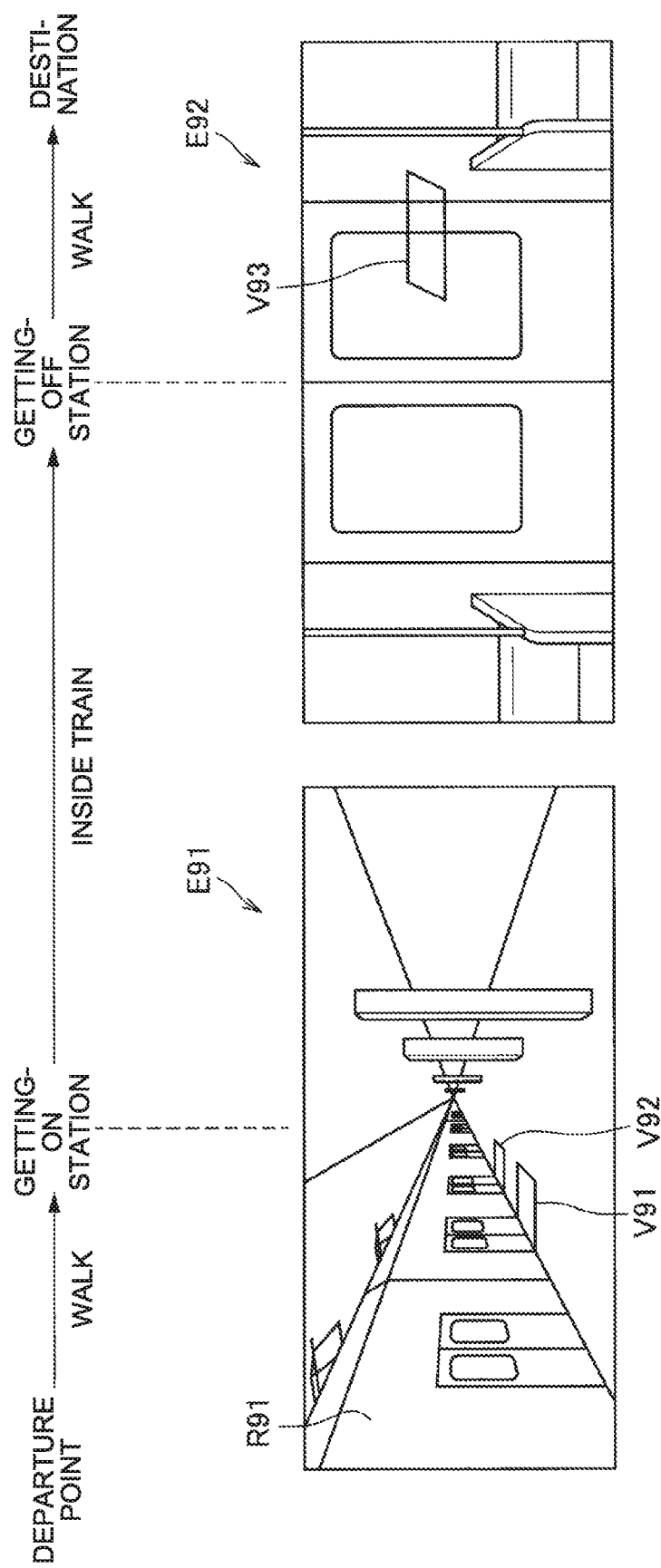
FIG. 27 is a view for describing an example of a virtual object presented to a user who uses a train.

Next, an example of a virtual object presented to a user who uses a train will be described. FIG. 27 is a view for describing an example of a virtual object presented to a user who uses a train. As illustrated in FIG. 27, a case where the user walks and moves from a "departure point" to a "getting-on station", moves from the "getting-on station" to a "getting-off station" inside the train, and walks and moves from the "getting-off station" to a "destination" is assumed.

In such a case, in a case where the user exists at the "getting-on station", it is preferable that the display control unit 143 adds virtual objects V91 and V92 to getting-on positions that are to be recommended to the user in a visual field E91. At this time, the getting-on positions that are to be recommended to the user may be a getting-on position corresponding to the shortest route or may be a getting-on position corresponding to a route whose degree of congestion depending on a time zone is lower than a threshold.

Note that the shortest route may be determined on the basis of information regarding a relationship between the getting-on position and information on the getting-off station. The degree of congestion depending on the time zone may be determined on the basis of a measurement result of an amount of floating population using a surveillance camera, may be determined on the basis of a reading result of a card by a reading apparatus installed at a ticket gate or a store of a station, or may be acquired from a Web page. Alternatively, both of the getting-on positions may be added together (by characters or icons).

In a case where the user exists "inside the train", the display control unit 143 may display nothing in a case where a position of the train is neither the getting-off station nor a transfer station. On the other hand, the display control unit 143 adds a virtual object V93 to a position of a destination (or adds a virtual object indicating a direction of the destination) in a visual field E92 in a case where the position of the train is the getting-off station and in a case where the train is being stopped. Alternatively, the display control unit 143 adds a virtual object to a transfer place (or adds a virtual object indicating a direction of the transfer place) in a visual field E92 in a case where the position of the train is the transfer station and in a case where the train is being stopped.

The display control unit 143 adds a virtual object to a position of the destination (or adds a virtual object indicating a direction of the destination) within a visual field in a case where the position of the train is the getting-off station (or in a case where the train is about to stop near the station) and in a case where the train is moving. Alternatively, the display control unit 143 adds a virtual object to a transfer place (or adds a virtual object indicating a direction of the transfer place) within a visual field in a case where the position of the train is the transfer station (or in a case where the train is about to stop near the station) and in a case where the train is moving.

Note that the display control unit 143 may add the virtual object within the visual field of the user also in a case where a distance from the train to the destination is within a predetermined distance (for example, within a range where the user can see the destination) and in a case where the train is moving.

<4. Hardware Configuration Example>

Figure 28:
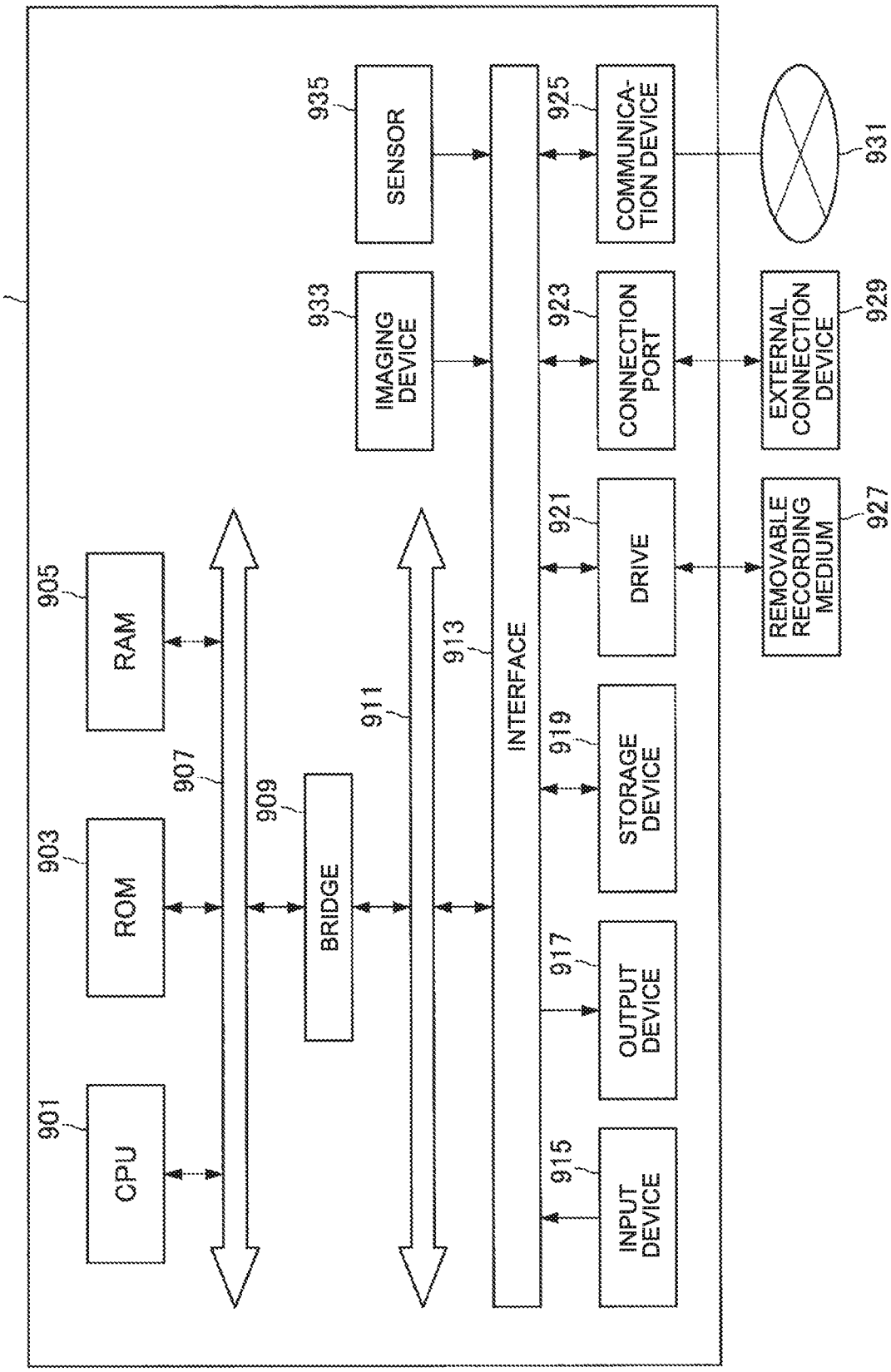
FIG. 28 is a block diagram illustrating a hardware configuration example of the information processing apparatus according to an embodiment of the present disclosure.

Next, a hardware configuration of the information processing apparatus 10 according to an embodiment of the present disclosure will be described with reference to FIG. 28. FIG. 28 is a block diagram illustrating a hardware configuration example of the information processing apparatus 10 according to an embodiment of the present disclosure.

As illustrated in FIG. 28, the information processing apparatus 10 includes a central processing unit (CPU) 901, a read only memory (ROM) 903, and a random access memory (RAM) 905. In addition, the information processing apparatus 10 may include a host bus 907, a bridge 909, an external bus 911, an interface 913, an input device 915, an output device 917, a storage device 919, a drive 921, a connection port 923, and a communication device 925. Furthermore, the information processing apparatus 10 may include an imaging device 933 and a sensor 935, if necessary. The information processing apparatus 10 may have a processing circuit called a digital signal processor (DSP) or an application specific integrated circuit (ASIC) instead of or together with the CPU 901.

The CPU 901 functions as an arithmetic processing device and a control device, and controls all or some of operations in the information processing apparatus 10 according to various programs recorded in the ROM 903, the RAM 905, the storage device 919, or a removable recording medium 927. The ROM 903 stores programs, operation parameters, or the like used by the CPU 901. The RAM 905 temporarily stores programs used in execution of the CPU 901, parameters appropriately changed in the execution, or the like. The CPU 901, the ROM 903, and the RAM 905 are connected to each other by the host bus 907 constituted by an internal bus such as a CPU bus or the like. Furthermore, the host bus 907 is connected to the external bus 911 such as a peripheral component interconnect/interface (PCI) bus or the like via the bridge 909.

The input device 915 is, for example, a device operated by the user, such as a mouse, a keyboard, a touch panel, a button, a switch, a lever, and the like. The input device 915 may include a microphone that detects a user's voice. The input device 915 may be, for example, a remote control device using infrared rays or other electric waves or may be an external connection device 929 such as a mobile phone or the like corresponding to an operation of the information processing apparatus 10. The input device 915 includes an input control circuit that generates an input signal on the basis of information input by the user and outputs the input signal to the CPU 901. The user inputs various data to the information processing apparatus 10 or instructs the information processing apparatus 10 to perform a processing operation by operating the input device 915. In addition, an imaging device 933 to be described later can also function as an input device by imaging movement of a user's hand, a user's finger, or the like. At this time, a pointing position may be determined according to the movement of the hand or a direction of the finger.

The output device 917 is constituted by a device that can visually or auditorily notify the user of acquired information. The output device 917 can be, for example, a display device such as a liquid crystal display (LCD), a plasma display panel (PDP), an organic electro-luminescence (EL) display, a projector, or the like, a hologram display device, a sound output device such as a speaker, a headphone, and the like, a printer device, and the like. The output device 917 outputs a result obtained by the processing of the information processing apparatus 10 as a video such as a text, an image, or the like, or output the result as a sound such as a voice, an audio, or the like. In addition, the output device 917 may include a light such as a light-emitting diode (LED) or the like.

The storage device 919 is a device for data storage configured as an example of a storage unit of the information processing apparatus 10. The storage device 919 is configured by, for example, a magnetic storage unit device such as a hard disk drive (HDD) or the like, a semiconductor storage device, an optical storage device, a magneto-optical storage device, or the like. The storage device 919 stores programs executed by the CPU 901 or various data, various data acquired from the outside, and the like.

The drive 921 is a reader/writer for a removable recording medium. 927 such as a magnetic disk, an optical disk, a magneto-optical disk, a semiconductor memory, or the like, and is built in or externally attached to the information processing apparatus 10. The drive 921 reads information recorded on the removable recording medium 927 that is mounted, and outputs the information to the RAM 905. In addition, the drive 921 also writes a record in the removable recording medium 927 that is mounted.

The connection port 923 is a port for directly connecting a de vice to the information processing apparatus 10. The connection port 923 can be, for example, a universal serial bus (USB) port, an IEEE1394 port, a small computer system interface (SCSI) port, and the like. In addition, the connection port 923 may be an RS-232C port, an optical audio terminal, a high-definition multimedia interface (HDMI) (registered trademark) port, or the like. By connecting the external connection device 929 to the connection port 923, various data can be exchanged between the information processing apparatus 10 and the external connection device 929.

The communication device 925 is, for example, a communication interface including a communication device or the like for connecting to a communication network 931. The communication device 925 can be, for example, a communication card or the like for wired or wireless local area network (LAN), Bluetooth (registered trademark), or wireless USB (WUSB). In addition, the communication device 925 may be a router for optical communication, a router for asymmetric digital subscriber line (ADSL), modems for various communication, or the like. The communication device 925 transmits and receives a signal or the like to or from, for example, the Internet or another communication device using a predetermined protocol such as transmission control protocol/Internet protocol (TCP/IP) or the like. In addition, the communication network 931 connected to the communication device 925 is a network connected in a wired or wireless manner, and is, for example, the Internet, a home LAN, infrared communication, radio wave communication, satellite communication, or the like.

The imaging device 933 is, for example, a device that generates a captured image by imaging a real space using an imaging element such as a charge coupled device (CCD), a complementary metal oxide semiconductor (CMOS), or the like, and various members such as a lens for controlling formation of a subject image on the imaging element, and the like. The imaging device 933 may be a device that captures a still image or may be a device that captures a moving image.

The sensor 935 is, for example, various sensors such as a distance measuring sensor, an acceleration sensor, a gyro sensor, a geomagnetic sensor, a vibration sensor, an optical sensor, a sound sensor, and the like. The sensor 935 acquires information regarding a state of the information processing apparatus 10 itself, such as a posture or the like of a housing of the information processing apparatus 10 or information regarding the surrounding environment of the information processing apparatus 10, such as brightness, noise, or the like, around the information processing apparatus 10. In addition, the sensor 935 may include a global positioning system (GPS) sensor that receives a (295 signal to measure a latitude, a longitude, and an altitude of the apparatus.

<5. Conclusion>

As described above, according to the embodiment of the present disclosure, there is provided an information processing apparatus including the acquisition unit that acquires the position information of the user and the position information of the destination and the display control unit that adds the first virtual object to the position of the destination within the visual field of the user on the basis of the position information of the user and the position information of the destination, in which the display control unit controls the transparency of the predetermined virtual object within the visual field on the basis of the position information of the user. According to such a configuration, the technology of presenting the virtual object useful for the user while suppressing the reduction in the visibility of the real object is provided.

<6. Modification>

Hereinabove, the preferred embodiments of the present disclosure have been described in detail with reference to the accompanying drawings, but a technical scope of the present disclosure is not limited to such embodiments. It will be apparent to those skilled in the art of the present disclosure that various modifications or alterations can be conceived within the scope of the technical idea described in the claims, and it is naturally understood that these modifications or alterations also fall within the technical scope of the present disclosure.

For example, it is possible to create a program for causing hardware such as a CPU, a ROM, a RAM, and the like, built in a computer to exert the same function as that of the control unit 140 described above. In addition, a computer-readable recording medium on which the program is recorded can be provided.

Hereinabove, the case where the self-position estimation unit 141 is incorporated in the information processing apparatus 10 has been mainly described. However, such a function may be incorporated in an apparatus different from the information processing apparatus 10. For example, the self-position estimation unit 141 may be incorporated in an apparatus (for example, a server) different from the information processing apparatus 10.

In addition, the effects described in the present specification are only illustrative or exemplary rather than being restrictive. That is, the technology according to the present disclosure can accomplish other effects apparent to those skilled in the art from the description of the present specification, in addition to or instead of the effects described above.

<7. Application Example>

An application example of the embodiment of the present disclosure described above will be described.

In the embodiment of the present disclosure, a bird's eye view or the like may be prepared in a case where there are a plurality of targets (destinations) or in a case where a user wants to visit a plurality of places. A browsability preference mode and a navigation mode of the bird's eye view or the like may be prepared and be switched and used with each other. For example, a case where a user has searched for a book about "DDD" in a bookstore to find targets at a plurality of places such as a travel corner, a business corner, or the like, is assumed. In such a case, the user may first confirm a position in the bird's eye view to decide where to go, and then walk toward the travel corner in the navigation mode. Even after the user arrives at the travel corner, the user may be notified of a position of the book by lightening the position of the book.

In the navigation mode, not only map display but also navigation information indicating a direction, a mark, or the like, may be superimposed and presented.

In a case where there are a plurality of targets, the plurality of targets may be displayed with priorities allocated according to distances to the targets, popularities of the targets, a degree of congestion, or the like, or display orders of the targets may be switched.

In a case where a distance to the target is long, a progress situation with respect to the distance to the target may be shown. In addition, an obstacle, a degree of congestion, or the like may be shown until the user arrives at the target.

In a case where the target is distant, in a case where floors are different from each other in the building, or the like, an intermediate target point up to the target may be provided and presented. For example, in a case where the target is a shop on a third floor and the user is currently at a building entrance on a first floor, a position of an elevator, an escalator, or a stairs may be first presented as the intermediate target point.

In a case where the user arrives at the target and there is no place, thing, or the like, that he or she has expected, the user may again search for the target. For example, for a case where the user has come to a place of a book of "DDD", but there is no book that he/she had expected or a case where the user would like to search for a book a little more, the user may be able to again search for a book even after the user arrives at the target.

Not only a static thing but also a dynamic thing that moves around may be the target. In a case where the target is a dynamic thing, a tracking function of the target may be included. For example, a child may be set as the target, and the child may be tracked and presented so that it can be grasped where the child is.

The target may be selected from things that have been pre-registered by "favorite registration" or the like. In addition, if there is favorite place while walking, that place may be able to be "favorite registered".

In a case where there is an obstacle such as a car, a person, or the like, passing in front of the user, the display of a virtual object may be eliminated. Alternatively, the display of the virtual object may be temporarily stopped.

Places of the target position or the intermediate target point may be indicated by sound image localization. At this time, vibration or a hanger reflection of a wearable device or the like attached to a user's hand may be used.

In a case where there is a ceiling, a map may be projected on the ceiling. In addition, the target may be expressed as if a curtain hangs down.

A display range may be changed depending on a state of the user. For example, when the user is walking, a visual field of the user is narrowed, and the display range may thus be narrowed. On the other hand, when the user stops, the display range may be widened.

As a method of presenting the virtual object, a method of projecting the virtual object on a floor, a road, or the like, may be adopted. At this time, 3D is preferably used, but 2D may be used.

Information on a thing (such as the other side of a wall, or the like) that cannot be directly seen due to a wall, which is a barrier, may be shown to pass through the wall or the like (notification). For example, in a case where the user is in a living room and is not aware that washing is finished, the user may be notified that the washing is finished by passing light through the wall to lighten a washing machine.

The target may be first displayed and the map may be displayed after the target.

The display of the virtual object may be eliminated when the user walks along the way.

For example, in a case where a curve that is significantly crooked is included as a route, a parameter may be set so that a place that the user is to pass through as a route is included in the display. For example, it is preferable that an expression is presented so that there is no phenomenon that the angle α is narrow, such that a part of the route is missing.

The brightness of the virtual object or the display may be adjusted according to external light, an environment, a background color, or the like. In addition, a presentation color of the virtual object may be changed The display granularity/expression may be changed according to prior knowledge of the user. For example, the display of a virtual object added to a place where the user always goes may be eliminated. A virtual object added to a place where the user goes for the first time may be displayed brightly.

A case where a user finds a bookstore is assumed. At, this time, in a case where the user wants to see the latest book somehow at the bookstore, it is preferable to notify the user of a place of the bookstore. Alternatively, in a case where the user wants to search for domestic travel magazines because he/she will go on a domestic travel this time, the user may be notified of a bookstore in which genres of travel magazines are put. Then, when the user enters the bookstore, the user may be notified of a position of a bookshelf where the domestic travel magazines are put.

Alternatively, a case where the user wants to search for a book called "FEE" of a resort because he/she will go to the resort this time is assumed. In such a case, the user may be notified of a bookstore where the book "FEE" is put. Then, when the user enters the bookstore, the user may be notified of a position of a bookshelf where the book "EEE" is put. When the user arrives at the position of the bookshelf where the book "EEE" is put, the user may be notified of a place of the book. For example, in a case where the user arrives at the place of the book to see the book and wants to also see another book regarding the resort, the user may again search for a new book on the spot.

Note that the following configurations also fall within the technical scope of the present disclosure.

(1)

An information processing apparatus comprising:

an acquisition unit that acquires position information of a user and position information of a destination; and a display control unit that adds a first virtual object in association with a position of the destination within a visual field of the user on the basis of the position information of the user and the position information of the destination, wherein the display control unit controls transparency of a predetermined virtual object within the visual field on the basis of the position information of the user.

(2)

The information processing apparatus according to (1), wherein the display control unit controls transparency of the first virtual object as the predetermined virtual object on the basis of a distance between a position of the user and the position of the destination.

(3)

The information processing apparatus according to (2), wherein the display control unit increases the transparency of the first virtual object in a case where the distance between the position of the user and the position of the destination is smaller than a first threshold as compared with a case where the distance is larger than the first threshold.

(4)

The information processing apparatus according to (2) or (3), wherein the display control unit increases the transparency of the first virtual object in a case where the distance between the position of the user and the position of the destination is larger than a second threshold as compared with a case where the distance is smaller than the second threshold.

(5)

The information processing apparatus according to any one of (1) to (4), wherein the display control unit adds a second virtual object to a position of a passing point within the visual field of the user on the basis of position information of the user and position information of the passing point in a case where the passing point is detected between the position of the user and the position of the destination.

(6)

The information processing apparatus according to any one of (1) to (5), wherein the display control unit adds the first virtual object to an area including the destination within the visual field of the user, and controls a size of the area on the basis of a relationship between the position of the user and the position of the destination.

(7)

The information processing apparatus according to any one of (1) to (6), wherein the display control unit arranges the first virtual object at a position of the destination in an augmented reality space on the basis of the position information of the user, the position information of the destination, and a direction of the user.

(8)

The information processing apparatus according to any one of (1) to (7), wherein the display control unit controls the transparency of the predetermined virtual object or brightness of a display unit that displays the predetermined virtual object, on the basis of brightness of an environment.

(9)

The information processing apparatus according to any one of (1) to (8), wherein the display control unit adds the first virtual object to a position of each of a plurality of destinations within the visual field of the user in a case where position information of the plurality of destinations is acquired, and controls transparency of the first virtual object added to the position of each of the plurality of destinations as the predetermined virtual object.

(10)

The information processing apparatus according to any one of (1) to (9), wherein the display control unit adds a third virtual object to a position within the visual field of the user on the basis of the position information of the user and position information of the point in a case where the position information of the point different from the destination is acquired, and controls transparency of the third virtual object as the predetermined virtual object on the basis of the position information of the user and the position information of the point.

(11)

The information processing apparatus according to (10), wherein the display control unit controls the transparency of the third virtual object on the basis of a distance between a position of the user and the position of the point.

(12)

The information processing apparatus according to (11), wherein the display control unit increases the transparency of the third virtual object in a case where the distance between the position of the user and the position of the point is smaller than a third threshold as compared with a case where the distance is larger than the third threshold.

(13)

The information processing apparatus according to (12), wherein the display control unit controls the third threshold on the basis of the distance between the position of the user and the position of the destination or whether or not the position of the user is outdoors.

(14)

The information processing apparatus according to any one of (11) to (13), wherein the display control unit increases the transparency of the third virtual object in a case where the distance between the position of the user and the position of the point is larger than a fourth threshold as compared with a case where the distance is smaller than the fourth threshold.

(15)

The information processing apparatus according to (14), wherein the display control unit controls the fourth threshold on the basis of the distance between the position of the user and the position of the destination or whether or not the position of the user is outdoors.

(16)

The information processing apparatus according to any one of (11) to (15), wherein the display control unit controls the transparency of the third virtual object on the basis of a direct on from the position of the user to the position of the destination and the position of the point.

(17)

The information processing apparatus according to (16), wherein the display control unit controls the transparency of the third virtual object according to whether or not the point exists in a range within a predetermined angle based on the direction.

(18)

The information processing apparatus according to (17), wherein the display control unit controls the angle on the basis of whether or not the user is moving or a distance between the position of the user and a position of a wall surface.

(19)

An information processing method comprising:

acquiring position information of a user and position information of a destination;

adding a first virtual object in association with a position of the destination within a visual field of the user on the basis of the position information of the user and the position information of the destination; and controlling, by a processor, transparency of a predetermined virtual object within the visual field on the basis of the position information of the user.

(20)

A computer-readable recording medium in which a program is recorded, the program causing a computer to function as an information processing apparatus including:

an acquisition unit that acquires position information of a user and position information of a destination; and a display control unit that adds a first virtual object in association with a position of the destination within a visual field of the user on the basis of the position information of the user and the position information of the destination, wherein the display control unit controls transparency of a predetermined virtual object within the visual field on the basis of the position information of the user.

REFERENCE SIGNS LIST

10 INFORMATION PROCESSING APPARATUS
110 ENVIRONMENT RECOGNITION IMAGING UNIT
120 OPERATION UNIT
130 SENSOR UNIT
131 ILLUMINANCE SENSOR
132 GEOMAGNETIC SENSOR
133 GPS SENSOR.
140 CONTROL UNIT
141 SELF-POSITION ESTIMATION UNIT
142 ACQUISITION UNIT
143 DISPLAY CONTROL UNIT
150 STORAGE UNIT
151 MAP INFORMATION
160 COMMUNICATION UNIT
170 DISPLAY UNIT

The invention claimed is:

1. An information processing apparatus comprising:
an acquisition unit configured to acquire a position of a user and a position of a destination; and
a display control unit configured to
add a first virtual object in association with the position of the destination within a visual field of the user based on the position of the user and the position of the destination,
control transparency of a predetermined virtual object within the visual field based on the position of the user,
add a second virtual object to a position of a passing point within the visual field of the user based on the position of the user and the position of the passing point in a case where the passing point is detected between the position of the user and the position of the destination, the passing point being a point at which the user is required to pass for the user to arrive at the destination, and
control, based on the predetermined virtual object not being another passing point within the visual field of the user, a transparency of the second virtual object to be less than the transparency of the predetermined virtual object,
wherein the acquisition unit and the display control unit are each implemented via at least one processor.

2. The information processing apparatus according to claim 1, wherein
the display control unit is further configured to control transparency of the first virtual object as the predetermined virtual object based on a distance between the position of the user and the position of the destination.

3. The information processing apparatus according to claim 2, wherein
the display control unit is further configured to increase the transparency of the first virtual object in a case where the distance between the position of the user and the position of the destination is smaller than a first threshold as compared with a case where the distance is larger than the first threshold.

4. The information processing apparatus according to claim 2, wherein
the display control unit is further configured to increase the transparency of the first virtual object in a case where the distance between the position of the user and the position of the destination is larger than a second threshold as compared with a case where the distance is smaller than the second threshold.

5. The information processing apparatus according to claim 1, wherein
the display control unit is further configured to
add the first virtual object to an area including the destination within the visual field of the user, and
control a size of the area based on a relationship between the position of the user and the position of the destination.

6. The information processing apparatus according to claim 1, wherein
the display control unit is further configured to arrange the first virtual object at the position of the destination in an augmented reality space based on the position of the user, the position of the destination, and a direction of the user.

7. The information processing apparatus according to claim 1, wherein
the display control unit is further configured to control the transparency of the predetermined virtual object or brightness of a display unit that displays the predetermined virtual object based on the brightness of an environment,
wherein the display unit is implemented via at least one processor.

8. The information processing apparatus according to claim 1, wherein
the display control unit is further configured to
add the first virtual object to a position of each destination of a plurality of destinations within the visual field of the user in a case where positions of the plurality of destinations are acquired, and
control transparency of the first virtual object added to the position of each destination of the plurality of destinations as the predetermined virtual object.

9. The information processing apparatus according to claim 1, wherein
the display control unit is further configured to
add a third virtual object to a position within the visual field of the user based on the position of the user and a position of a point different from the destination in a case where the position of the point different from the position of the destination is acquired, and
control transparency of the third virtual object as the predetermined virtual object based on the position of the user and the position of the point.

10. The information processing apparatus according to claim 9, wherein
the display control unit is further configured to control the transparency of the third virtual object based on a distance between the position of the user and the position of the point.

11. The information processing apparatus according to claim 10, wherein the display control unit is further configured to increase the transparency of the third virtual object in a case where the distance between the position of the user and the position of the point is smaller than a third threshold as compared with a case where the distance is larger than the third threshold.

12. The information processing apparatus according to claim 11, wherein the display control unit is further configured to control the third threshold based on a distance between the position of the user and the position of the destination or whether or not the position of the user is outdoors.

13. The information processing apparatus according to claim 10, wherein the display control unit is further configured to increase the transparency of the third virtual object in a case where the distance between the position of the user and the position of the point is larger than a fourth threshold as compared with a case where the distance is smaller than the fourth threshold.

14. The information processing apparatus according to claim 13, wherein the display control unit is further configured to control the fourth threshold based on the distance between the position of the user and the position of the destination or whether or not the position of the user is outdoors.

15. The information processing apparatus according to claim 10, wherein the display control unit is further configured to control the transparency of the third virtual object based on a direction from the position of the user to the position of the destination and the position of the point.

16. The information processing apparatus according to claim 15, wherein the display control unit is further configured to control the transparency of the third virtual object according to whether or not the point exists in a range within a predetermined angle based on the direction.

17. The information processing apparatus according to claim 16, wherein the display control unit is further configured to control the predetermined angle based on whether or not the user is moving or a distance between the position of the user and a position of a wall surface.

18. An information processing method comprising:

acquiring a position of a user and a position of a destination;

adding a first virtual object in association with the position of the destination within a visual field of the user based on the position of the user and the position of the destination;

controlling, by a processor, transparency of a predetermined virtual object within the visual field based on the position of the user;

adding a second virtual object to a position of a passing point within the visual field of the user based on the position of the user and the position of the passing point in a case where the passing point is detected between the position of the user and the position of the destination, the passing point being a point at which the user is required to pass for the user to arrive at the destination; and controlling, based on the predetermined virtual object not being another passing point within the visual field of the user, a transparency of the second virtual object to be less than the transparency of the predetermined virtual object.

19. A non-transitory computer-readable medium having embodied thereon a program, which when executed by a computer causes the computer to execute an information processing method, the method comprising:

acquiring a position of a user and a position of a destination;

adding a first virtual object in association with the position of the destination within a visual field of the user based on the position of the user and the position of the destination;

controlling transparency of a predetermined virtual object within the visual field based on the position of the user;

adding a second virtual object to a position of a passing point within the visual field of the user based on the position of the user and the position of the passing point in a case where the passing point is detected between the position of the user and the position of the destination, the passing point being a point at which the user is required to pass for the user to arrive at the destination; and controlling, based on the predetermined virtual object not being another passing point within the visual field of the user, a transparency of the second virtual object to be less than the transparency of the predetermined virtual object.

20. The information processing apparatus according to claim 7, wherein the display control unit is further configured to decrease the transparency of the first virtual object based on an increase in the brightness of the environment.

* * * * *